United States Patent
Kuo et al.

(10) Patent No.: US 9,598,602 B2
(45) Date of Patent: *Mar. 21, 2017

(54) THERMOSETTING COMPOSITIONS BASED ON PHENOLIC RESINS AND CURABLE POLEYESTER RESINS MADE WITH DIKETENE OR BETA-KETOACETATE CONTAINING COMPOUNDS

(71) Applicant: Eastman Chemical Company, Kingsport, TN (US)

(72) Inventors: Thauming Kuo, Kingsport, TN (US); Phillip Bryan Hall, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,490

(22) Filed: Nov. 13, 2014

(65) Prior Publication Data
US 2016/0137877 A1    May 19, 2016

(51) Int. Cl.
*C09D 167/02* (2006.01)
*C09D 161/06* (2006.01)
*C08G 63/91* (2006.01)

(52) U.S. Cl.
CPC ......... *C09D 167/02* (2013.01); *C08G 63/916* (2013.01); *C09D 161/06* (2013.01)

(58) Field of Classification Search
CPC ...... C08L 61/04; C08L 61/06; C08L 2201/56; C08L 2201/54; C09D 167/02; C09D 167/06; C09D 161/06; C08G 63/916; C08G 8/08
See application file for complete search history.

(56) References Cited

U.S. PATENT DOCUMENTS

| | | |
|---|---|---|
| 3,018,272 A | 1/1962 | Griffing et al. |
| 3,033,822 A | 5/1962 | Kibler et al. |
| 3,075,952 A | 1/1963 | Coover, Jr. et al. |
| 3,108,083 A * | 10/1963 | Deno Laganis ....... C08G 63/20 428/458 |
| 3,216,884 A * | 11/1965 | O'Donnell ............... C08L 67/06 427/439 |
| 3,227,764 A | 1/1966 | Martin et al. |
| 3,312,645 A * | 4/1967 | George ............... C08G 63/6854 525/501.5 |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,528,947 A | 9/1970 | Lappin et al. |
| 3,538,187 A | 11/1970 | Feltzen |
| 3,734,874 A | 5/1973 | Kibler et al. |
| 3,772,227 A * | 11/1973 | Kapalko et al. ........... C08F 8/14 523/402 |
| 3,779,993 A | 12/1973 | Kibler et al. |
| 3,789,044 A | 1/1974 | Taft et al. |
| 3,800,004 A * | 3/1974 | Sherwood ............. C08F 299/04 523/509 |
| 3,856,830 A | 12/1974 | Kuehn |
| 4,054,681 A | 10/1977 | Brüning et al. |
| 4,074,061 A | 2/1978 | Musser |
| 4,076,766 A | 2/1978 | Simms |
| 4,119,680 A * | 10/1978 | Vachon ............... C08G 63/6888 524/539 |
| 4,120,847 A | 10/1978 | Culbertson |
| 4,196,109 A | 4/1980 | Laganis et al. |
| 4,264,671 A | 4/1981 | Gillern et al. |
| 4,267,279 A | 5/1981 | Howell |
| 4,299,933 A | 11/1981 | McConnell et al. |
| 4,304,901 A | 12/1981 | O'Neill et al. |
| 4,322,508 A | 3/1982 | Peng et al. |
| 4,338,379 A | 7/1982 | Strolle et al. |
| 4,350,807 A | 9/1982 | McConnell et al. |
| 4,363,908 A | 12/1982 | Joyner et al. |
| 4,397,989 A | 8/1983 | Adesko |

(Continued)

FOREIGN PATENT DOCUMENTS

BE         615850        7/1962
CA     2 111 927 A1     6/1994
(Continued)

OTHER PUBLICATIONS

Witzeman et al.; "Comparison of Methods for the Preparation of Acetoacetylated Coating Resins"; Journal of Coatings Technology; vol. 62; No. 789; Oct. 1990; pp. 101-112.

Narayan et al.; "Properties of acetoacetylated hydroxylated polyesters based polyurethane coatings"; Progress in Organic Coatings; 45; (2002); pp. 59-67.

ASTM D4752-10; Standard Practice for Measuring MEK Resistance of Ethyl Silicate (Inorganic) Zinc-Rich Primers by Solvent Rub.

ASTM D4274-11; Standard Test Methods for Testing Polyurethane Raw Materials: Determination of Hydroxyl Numbers of Polyols.

International Search Report and Written Opinion for PCT/US2010/000212 dated Apr. 7, 2010.

(Continued)

*Primary Examiner* — Michael A Salvitti
(74) *Attorney, Agent, or Firm* — Matthew W. Smith

(57) ABSTRACT

A thermosetting composition having:
I. a curable polyester resin containing beta-ketoacetate moieties without vinyl unsaturations; and
II. a phenolic resin having at least one methylol group.

The curable polyester resin can be made by reacting a polyester resin with a compound containing a beta-ketoacetate moiety that does not contain a vinyl unsaturation such as alkyl acetoacetate compounds or diketene compounds.

The curable polyester resin can be dispersed in water or dissolved in a solvent and is suitable for waterborne or solventborne coating compositions. Phenolic based crosslinking coating compositions that contain these curable polyester resins cure well with phenolic resin crosslinking compounds.

41 Claims, No Drawings

(56) References Cited

U.S. PATENT DOCUMENTS

| | | | |
|---|---|---|---|
| 4,433,119 A * | 2/1984 | Brode | C07C 43/30 425/543 |
| 4,480,077 A | 10/1984 | Hefner, Jr. | |
| 4,525,504 A | 6/1985 | Morris et al. | |
| 4,525,544 A | 6/1985 | Nelson et al. | |
| 4,581,093 A | 4/1986 | Noyes et al. | |
| 4,585,854 A | 4/1986 | Tung et al. | |
| 4,698,391 A | 10/1987 | Yacobucci et al. | |
| 4,716,200 A | 12/1987 | Berghoff | |
| 4,724,173 A | 2/1988 | Rockett et al. | |
| 4,737,551 A | 4/1988 | Dervan et al. | |
| 4,751,267 A | 6/1988 | Berghoff | |
| 4,771,101 A | 9/1988 | Pruett et al. | |
| 4,859,760 A | 8/1989 | Light, Jr. et al. | |
| 4,910,292 A | 3/1990 | Blount | |
| 4,939,233 A | 7/1990 | Jenkins et al. | |
| 4,959,259 A | 9/1990 | Guilbaud | |
| 5,017,679 A | 5/1991 | Chang et al. | |
| 5,023,367 A | 6/1991 | Calbo, Jr. et al. | |
| 5,025,086 A | 6/1991 | Blount, Jr. et al. | |
| 5,097,006 A | 3/1992 | Kapilow et al. | |
| 5,124,388 A | 6/1992 | Pruett et al. | |
| 5,160,792 A | 11/1992 | Barbee et al. | |
| 5,218,042 A | 6/1993 | Kuo et al. | |
| 5,245,002 A * | 9/1993 | Kuo | C08G 63/60 524/601 |
| 5,254,637 A | 10/1993 | Witzeman et al. | |
| 5,256,759 A | 10/1993 | Kuo | |
| 5,256,761 A | 10/1993 | Blount, Jr. | |
| 5,288,820 A | 2/1994 | Rector, Jr. et al. | |
| 5,290,631 A | 3/1994 | Fleury et al. | |
| 5,306,567 A | 4/1994 | Kuo et al. | |
| 5,321,118 A | 6/1994 | Hubbs et al. | |
| 5,326,820 A | 7/1994 | Hoffmann et al. | |
| 5,344,872 A | 9/1994 | Debord et al. | |
| 5,349,026 A | 9/1994 | Emmons et al. | |
| 5,369,210 A | 11/1994 | George et al. | |
| 5,371,148 A | 12/1994 | Taylor et al. | |
| 5,393,609 A | 2/1995 | Chang et al. | |
| 5,393,840 A | 2/1995 | Kuo | |
| 5,393,849 A * | 2/1995 | Srinivasan | C08F 299/04 525/420 |
| 5,397,641 A | 3/1995 | Moens et al. | |
| 5,416,187 A * | 5/1995 | Kuo | C08G 63/60 524/81 |
| 5,439,988 A | 8/1995 | Moens et al. | |
| 5,464,909 A | 11/1995 | Chang et al. | |
| 5,498,668 A | 3/1996 | Scott | |
| 5,541,268 A | 7/1996 | Fenn et al. | |
| 5,554,701 A | 9/1996 | Chang et al. | |
| 5,596,037 A | 1/1997 | Moens et al. | |
| 5,646,237 A | 7/1997 | George et al. | |
| 5,654,347 A | 8/1997 | Khemani et al. | |
| 5,696,176 A | 12/1997 | Khemani et al. | |
| 5,852,120 A | 12/1998 | Bederke | |
| 5,919,873 A * | 7/1999 | Irving | C08F 283/00 428/482 |
| 5,955,565 A | 9/1999 | Morris et al. | |
| 5,993,975 A | 11/1999 | Tanaka et al. | |
| 6,087,464 A | 7/2000 | Swarup et al. | |
| 6,120,851 A | 9/2000 | Borgholte et al. | |
| 6,184,311 B1 | 2/2001 | O'Keeffe et al. | |
| 6,211,309 B1 | 4/2001 | McIntosh et al. | |
| 6,248,843 B1 | 6/2001 | Panandiker et al. | |
| 6,255,366 B1 | 7/2001 | Adams et al. | |
| 6,265,072 B1 | 7/2001 | Fagerburg | |
| 6,423,816 B1 | 7/2002 | Wamprecht et al. | |
| 6,444,781 B1 | 9/2002 | Kuo et al. | |
| 6,780,523 B2 * | 8/2004 | Kuo | C08G 63/914 428/480 |
| 6,887,937 B1 | 5/2005 | Vandevoorde et al. | |
| 6,992,133 B2 | 1/2006 | Yokoyama et al. | |
| 6,995,194 B2 | 2/2006 | Moens et al. | |
| 7,087,672 B2 | 8/2006 | Yuan et al. | |
| 7,141,625 B2 | 11/2006 | Komazaki et al. | |
| 8,163,850 B2 | 4/2012 | Marsh et al. | |
| 8,168,721 B2 | 5/2012 | Marsh et al. | |
| 8,324,316 B2 | 12/2012 | Powell et al. | |
| 8,449,960 B2 | 5/2013 | Skillman et al. | |
| 8,519,055 B2 | 8/2013 | Marsh et al. | |
| 8,524,834 B2 | 9/2013 | Marsh et al. | |
| 8,580,872 B2 | 11/2013 | Kuo et al. | |
| 8,663,765 B2 | 3/2014 | Skillman et al. | |
| 9,029,460 B2 | 5/2015 | Marsh et al. | |
| 9,029,461 B2 | 5/2015 | Marsh et al. | |
| 9,096,772 B2 * | 8/2015 | Lespinasse | C09D 167/00 |
| 2001/0051706 A1 | 12/2001 | George et al. | |
| 2002/0086154 A1 | 7/2002 | Miller et al. | |
| 2002/0103329 A1 | 8/2002 | Koldijk et al. | |
| 2003/0083425 A1 | 5/2003 | Morimoto et al. | |
| 2003/0113462 A1 | 6/2003 | Hirose et al. | |
| 2003/0205852 A1 | 11/2003 | Porter | |
| 2004/0024140 A1 | 2/2004 | Fujita et al. | |
| 2004/0087736 A1 | 5/2004 | Wu et al. | |
| 2005/0176859 A1 * | 8/2005 | Tinkl | C08K 5/13 524/111 |
| 2006/0079650 A1 | 4/2006 | Stevenson et al. | |
| 2006/0286383 A1 | 12/2006 | Gilmer | |
| 2007/0020557 A1 | 1/2007 | Yao et al. | |
| 2007/0092746 A1 | 4/2007 | Wayton et al. | |
| 2007/0232778 A1 | 10/2007 | Moody et al. | |
| 2007/0276065 A1 | 11/2007 | Barton et al. | |
| 2008/0092776 A1 | 4/2008 | Stockl et al. | |
| 2008/0135060 A1 * | 6/2008 | Kuo | A24D 3/08 131/332 |
| 2008/0139687 A1 | 6/2008 | Woods et al. | |
| 2009/0047524 A1 | 2/2009 | Yaoi et al. | |
| 2009/0110843 A1 | 4/2009 | Halahmi et al. | |
| 2010/0204363 A1 | 8/2010 | Marsh et al. | |
| 2010/0204388 A1 | 8/2010 | Marsh et al. | |
| 2010/0204392 A1 | 8/2010 | Marsh et al. | |
| 2010/0204401 A1 | 8/2010 | Marsh et al. | |
| 2010/0204413 A1 | 8/2010 | Powell et al. | |
| 2010/0297422 A1 | 11/2010 | Lucas | |
| 2011/0315591 A1 * | 12/2011 | Lespinasse | C09D 167/00 206/524.3 |
| 2012/0101187 A1 * | 4/2012 | Kuo | C09D 5/024 523/335 |
| 2012/0172520 A1 | 7/2012 | Marsh et al. | |
| 2012/0202920 A1 | 8/2012 | Marsh et al. | |
| 2013/0023604 A1 | 1/2013 | Kuo et al. | |
| 2013/0296470 A1 | 11/2013 | Marsh et al. | |
| 2013/0296488 A1 | 11/2013 | Marsh et al. | |
| 2013/0324640 A1 * | 12/2013 | Parish | C09D 163/00 523/400 |
| 2014/0018496 A1 | 1/2014 | Kuo et al. | |
| 2014/0296406 A1 | 10/2014 | Marsh et al. | |
| 2014/0296407 A1 | 10/2014 | Marsh et al. | |
| 2014/0303283 A1 * | 10/2014 | Ding | C09D 133/00 523/429 |
| 2015/0034522 A1 | 2/2015 | Itou et al. | |
| 2015/0099827 A1 | 4/2015 | Hagiwara et al. | |
| 2015/0099837 A1 | 4/2015 | Argyropoulos et al. | |
| 2016/0115274 A1 * | 4/2016 | Kuo | C08G 63/199 524/236 |
| 2016/0115345 A1 * | 4/2016 | Kuo | C09D 167/02 427/427.4 |
| 2016/0115347 A1 * | 4/2016 | Kuo | C09D 167/02 524/361 |
| 2016/0115348 A1 * | 4/2016 | Kuo | C08L 67/06 427/385.5 |

FOREIGN PATENT DOCUMENTS

| | | |
|---|---|---|
| EP | 1 273 626 A1 | 1/2003 |
| EP | 1 647 564 | 4/2006 |
| GB | 1 044 015 | 9/1966 |
| GB | 1 115 189 A | 5/1968 |
| GB | 1 130 558 | 10/1968 |
| GB | 2 025 998 | 10/1982 |
| JP | 03-038281 | 2/1991 |
| JP | 08-073781 | 3/1996 |

(56) References Cited

FOREIGN PATENT DOCUMENTS

| | | |
|---|---|---|
| JP | 09-003341 | 1/1997 |
| JP | 2002-235038 | 8/2002 |
| JP | 2004-339493 A | 12/2004 |
| JP | 2006-233068 | 9/2006 |
| WO | WO 94/01506 | 1/1994 |
| WO | WO 94/12557 | 6/1994 |
| WO | WO 95/01407 | 1/1995 |
| WO | WO 96/33229 | 10/1996 |
| WO | WO 01/48097 A1 | 7/2001 |
| WO | WO 2006/083343 | 8/2006 |
| WO | WO 2006/138198 | 12/2006 |
| WO | WO 2007/001567 | 1/2007 |
| WO | WO 2007/001571 A1 | 1/2007 |
| WO | WO 2007/078851 | 7/2007 |
| WO | WO 2013/098218 A1 | 7/2013 |
| WO | WO 2014/203857 A1 | 12/2014 |
| WO | WO 2015/156094 A1 | 10/2015 |

OTHER PUBLICATIONS

International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
International Search Report and Written Opinion for PCT/US2015/057524 dated Jun. 17, 2016.
Anonymous, "The Use of Cycloaliphatic Diacids and Anhydrides as Monomers for Polyester Polymers to Improve their Compatibility with Acrylic Polymers", Research Disclosure, 360, (1994), pp. 229-230.
Couchman, P. R.; "Compositional Variation of Glass-Transition Temperatures. 2. Application of the Thermodynamic Theory to Compatible Polymer Blends"; Macromolecules 1978, 11(6); pp. 1156-1161.
Heidt, et al., "Florida weathering of lsophthalic Acid-Based, MelamineCrosslinked Polyester Coatings", Proceedings of the Twenty-Seventh International Waterborne, High Solids and Powder Coatings Symposium (2000), 27th 295-307.
Husbands, M.J., et al., "Polyester Resubgs", A Manual of Resins for Surface Coatings, vol. III, pp. 63-167.
Jorissen, D.A., et al., "Higher Solids Polyurethane Coatings", Proceedings of the International Waterborne, High-Solids and Powder Coatings Symposium, (1992), 19th ed. pp. 182-195.
"Coating Processes (Powder Technology)"; Kirk-Othmer Encyclopedia of Chemical Technology, 4th Edition, vol. 6, p. 641.
Ni, Hai, et al., "Cycloaliphatic Polyester Based High Solids Polyurethane Coatings: I. The Effect of Difunctional Alcohols", Journal of Coatings Technology, vol. 74, No. 928 (2002), pp. 49-56.
Oldring, P.K.T., et al., "Vinyl and Acrylic Monomers", A Manual of Resins for Surface Coatings, vol. II, pp. 121-210.
Oldring, P.K.T. et al.; Resins for Surface Coatings; vol. III; pp. 63-167; SITA Technology; London, UK; 1987.
Seo, Kab S., et al. "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Vandevoorde, P., et al. "Making solid gains Novel acrylic and polyester polyols reduce VOCs in solventborne urethanes", European Coatings Journal (2005) (9) pp. 22-24, 26-29.
Wicks, Zeno Jr., et al., "Polyester Resings", Organic Coatings Science and Technology, 2nd ed., 13, (1999), p. 246-257.

Co-pending U.S. Appl. No. 14/026,424, filed Sep. 13, 2013, Kuo et al.
Non-Final Office Action dated Nov. 16, 2015 received in co-pending U.S. Appl. No. 14/026,424.
Final Office Action dated Mar. 3, 2016 received in co-pending U.S. Appl. No. 14/026,424.
Co-pending U.S. Appl. No. 15/172,288, filed Jun. 3, 2016, Kuo et al.
Co-pending U.S. Appl. No. 14/524,509, filed Oct. 27, 2014, Kuo et al.
Non-Final Office Action dated Sep. 28, 2015 received in co-pending U.S. Appl. No. 14/524,509.
Notice of Allowance dated Mar. 10, 2016 received in co-pending U.S. Appl. No. 14/524,509.
Notice of Allowance dated Jun. 10, 2016 received in co-pending U.S. Appl. No. 14/524,509.
Co-pending U.S. Appl. No. 14/524,514, filed Oct. 27, 2014, Kuo et al.
Non-Final Office Action dated May 6, 2016 received in co-pending U.S. Appl. No. 14/524,514.
Co-pending U.S. Appl. No. 14/683,278, filed Apr. 10, 2015, Kuo et al.
Non-Final Office Action dated May 4, 2016 received in co-pending U.S. Appl. No. 14/683,278.
Co-pending U.S. Appl. No. 14/716,027, filed May 19, 2015, Zhou et al.
Co-pending U.S. Appl. No. 14/865,112, filed Sep. 25, 2015, Inglefield et al.
Co-pending U.S. Appl. No. 14/922,846, filed Oct. 26, 2016, Kuo et al.
Co-pending U.S. Appl. No. 15/078,537, filed Mar. 23, 2016, Zhou et al.
International Search Report and Written Opinion for PCT/US2015/057529 dated Jan. 27, 2016.
International Search Report and Written Opinion for PCT/US2012/045357 dated Sep. 24, 2012.
ASTM D522; Standard Test Methods for Mandrel Bend Test of Attached Organic Coatings.
ASTM D1639-90; Standard Test Method for Acid Value of Organic Coating Materials.
ASTM D2794; Standard Test Method for Resistance of Organic Coatings to the Effect of Rapid Deformation (Impact).
ASTM D3359—09$^{\epsilon 2}$; Standard Test Methods for Measuring Adhesion by Tape Test.
ASTM D3363; Standard Test Method for Film Hardness by Pencil Test.
ASTM D3418; Standard Test Method for Transition Temperatures and Enthalpies of Fusion and Crystallization of Polymers by Differential Scanning Calorimetry.
ASTM D4287; Standard Test Method for High-Shear Viscosity Using a Cone/Plate Viscometer.
ASTM D4366; Standard Test Method for Hardness of Organic Coatings by Pendulum Damping Tests.
ASTM D6279; Standard Test Method for Rub Abrasion Mar Resistance of High Gloss Coatings.
Biedermann et al.; "Phenolic resins for can coatings: II. Resoles based on.cresol/phenol mixtures of tert. butyl phenol"; LWT—Food Science and Technology; 39; (2006); pp. 647-659 (Elsevier).
The Chemisty of Polyurethane Coatings, Technical Publication, p. 20, by Bayer Material Science, 2005.
Zhang, Musan et al.; "Tailoring adhesive performance of sulfonated segmented block copolymers"; Database CA [Online]; Chemical Abstracts Service; XP002682877.
International Search Report and Written Opinion for PCT/US2016/32646 dated Aug. 16, 2016.

* cited by examiner

THERMOSETTING COMPOSITIONS BASED ON PHENOLIC RESINS AND CURABLE POLEYESTER RESINS MADE WITH DIKETENE OR BETA-KETOACETATE CONTAINING COMPOUNDS

1. FIELD OF THE INVENTION

This invention pertains to thermosetting coating compositions, and more particularly to thermosetting coating compositions containing phenolic resins and curable polyester resin containing beta-ketoacetate moiety or made with diketene or compounds having beta-ketoacetate moiety.

2. BACKGROUND OF THE INVENTION

Metal containers are commonly used for food and beverage packaging. The containers are typically made of steel or aluminum. A prolonged contact between the metal and the filled product can lead to corrosion of the container. To prevent direct contact between filled product and metal, a coating is typically applied to the interior of the food and beverage cans. In order to be effective, such a coating must have adequate properties that are needed for protecting the packaged products, such as adhesion, corrosion resistance, chemical resistance, flexibility, stain resistance, and hydrolytic stability. Moreover, the coating must be able to withstand processing conditions during can fabrication and food sterilization. Coatings based on a combination of epoxy and phenolic resins are known to be able to provide a good balance of the required properties and are most widely used. There are industry sectors moving away from food contact polymers made with bisphenol A (BPA) and bisphenol A diglycidyl ether (BADGE), which are the building blocks of the epoxy resins. Thus, there exists a desire for the replacement of epoxy resin used in interior can coatings.

Polyester has been of particular interest to the coating industry to be used as a replacement for epoxy resin because of its comparable properties such as flexibility and adhesion. It is known by one skilled in the art that crosslinking between common polyester and phenolic resin is too poor to provide adequate properties for use in interior can coatings. Specifically, conventional polyesters having hydroxyl functionalities are not reactive enough with phenolic resins under curing conditions to provide adequate cross-linking density, resulting a coating that lacks good solvent resistance.

There remains a need for a coating system based on curable polyester resins and phenolic resins that is capable of providing effective crosslinking to achieve the desirable coating properties.

3. SUMMARY OF THE INVENTION

In an effort to search for functional polyesters that are capable of crosslinking with phenolic resins to provide desirable coating properties, the present inventors have surprisingly discovered that polyesters containing beta-ketoacetate moieties are curable with resole phenolic resins. Coatings based on such polyesters and resole phenolic resins are found to exhibit excellent solvent resistance, indicating effective crosslinking of the two components.

Thus, there is now provided a thermosetting composition comprising:
I. a curable polyester resin containing beta-ketoacetate moieties without vinyl unsaturation; and
II. a phenolic resin having at least one methylol group.

There is now also provided a thermosetting composition comprising:
I) a curable polyester resin comprising the reaction product of a polyester resin with a compound containing a beta-ketoacetate moiety that does not contain a vinyl unsaturation; and
II) a phenolic resin substituted with at least one methylol group.

There is now also provided a thermosetting composition comprising:
I) a curable polyester resin comprising the reaction product of a polyester resin with a compound containing a beta-ketoacetate moiety that does not contain a vinyl unsaturation, said polyester resin comprising the reaction product of:
  a) polyhydroxyl compounds comprising:
    (i) diol compounds in an amount of 70 mole %-100 mole %; and
    (ii) polyhydroxyl compounds having 3 or more hydroxyl groups in an amount of 0 to 30 mole %;
    wherein the mole % is based on 100% of all moles of polyhydroxyl compounds a); and
  b) polycarboxyl compounds comprising polycarboxylic acid compounds, derivatives of polycarboxylic acid compounds, the anhydrides of polycarboxylic acids, or combinations thereof; and
II) a phenolic resin substituted with at least one methylol group.

4. DETAILED DESCRIPTION OF THE INVENTION

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not only the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ alkyl groups" is intended to specifically include and disclose $C_1$ and $C_5$ alkyl groups as well as $C_2$, $C_3$, and $C_4$ alkyl groups.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "polycarboxylic acid", a "residue" is synonymous with "at least one" or "one or more" polyesters, polycarboxylic acids, or residues and is thus intended to refer to both a single or plurality of polyesters, polycarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable polyester", as used herein, is synonymous with the term "resin" and is intended to mean a polymer prepared by the reaction of a compound having a beta-ketoacetate moiety and a polyester polymer having hydroxyl groups. The curable polyester of the present invention is useful to make a thermoset polymer and is particularly suitable as a resin for coatings.

The term "residue(s)" means the portion of a molecule in the polyester that remains after its reaction to form the curable polyester resin or a polyester polymer.

A compound or curable polyester resin having a beta-ketoacetate moiety also includes its enol tautomer.

The phrase "at least a portion" includes a portion or the whole.

Thus, there is now provided a thermosetting composition comprising:
I. a curable polyester resin containing beta-ketoacetate moieties; and
II. a phenolic resin having at least one methylol group.

At least a portion of the phenolic resin II (or phenoplast) contains phenol moeities substituted with at least one methylol group on the phenolic ring. At least a portion of the methylol substituents is unreacted and available for reaction when added to or combined with the curable polyester resin. The phenolic resin desirably contains groups of the following formula (methylol):

—CH$_2$OH

Desirably, at least one methylol substituent is in the ortho position relative to the phenolic hydroxyl group. The phenolic resin is desirably obtained by the reaction of phenols (which for purposes of this disclosure include substituted and unsubstituted phenols) and an aldehyde at an aldehyde:phenol ratio of greater than 1:1, or at least 1.05:1, or at least 1.1:1, or at least 1.2:1, or at least 1.25:1, or at least 1.3:1, or at least 1.35:1, or at least 1.4:1, or at least 1.45:1, or at least 1.5:1, or at least 1.55:1, or at least 1.6:1, or at least 1.65:1, or at least 1.7:1, or at least 1.75:1, or at least 1.8:1, or at least 1.85:1, or at least 1.9:1, or at least 1.95:1, or at least 2:1. The phenolic resin is desirably a resole phenolic resin.

The phenolic resin desirably contains an average of at least one methylol substituent per one phenolic hydroxyl group.

The phenolic resin obtained by the condensation of phenols with aldehydes of the general formula RCHO, where R is hydrogen or a hydrocarbon group having 1 to 8 carbon atoms. Specific examples include formaldehyde, acetaldehyde, propionaldehyde, furfuraldehyde, or benzaldehyde. Desirably, the phenolic resin is the reaction product of phenols with formaldehyde.

Various phenols can be used such as phenol, m-cresol, o-cresol, p-cresol, m-alkylphenol, m-phenylphenol, o-alkylphenol, o-phenylphenol, p-alkylphenol, p-phenylphenol, p-butylphenol, resorcinol, 2,6-xylenol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol m-alkoxyphenol, o-alkoxyphenol, p-phenoxyphenol, o-phenoxyphenol, or mixtures thereof.

The phenolic resins are desirably heat curable. The phenolic resin is desirably not made by the addition of bisphenol A, F, or S (collectively "BPA"). Additionally or in the alternative, the phenolic resin is desirably not made by the addition of a polyhydric phenol.

The phenolic resin can be a reaction product of phenol, meta-, ortho-, or para-cresol, and a stoichiometric excess of formaldehyde. Desirably, the resole phenolic resin is a reaction product based on either unsubstituted phenol or meta-substituted phenol. The most preferred resole phenolic resin is based on unsubstituted phenol.

The resole is desirably of the type that is soluble in alcohol or water. The resole resin can be liquid at 25° C. The resole resin can have a molecular weight Mn from 300 to 450.

Examples of suitable commercial phenolic resins include, but are not limited to, PHENODUR® PR 516/60B, PHENODUR® PR 371/70B (based on unsubstituted phenol and formaldehyde), and PHENODUR® PR 612/80B, PR 285 55/IB/B, PR897) available from Allnex; BRJ-473, FB-110 XB-50, FB-209 BT-57, SP-1044, SP-1045, HRJ 10518, SP-103 and HRJ-1367 available from SI Group; those with DUREZ® or VARCUM® trade names available from Durex Corp. (e.g. Durez 33162); and those with Bakelite® trade name available from MOMENTIVE (e.g. Bakelite 6535LB, 6581 LB, 6812LB).

Desirably, none of the ingredients in the thermosetting composition are synthesized with the addition of BPA, or with the addition of polyhydric phenols.

The classic crosslinking mechanism thought to operate between a phenolic resin and a polyester was a condensation reaction across the hydroxyl groups on the phenolic resin and the polyester polyol, and as a result, the reaction is not sufficiently rapid and does not form an adequate crosslinking density. Such a mechanism can be illustrated as follows:

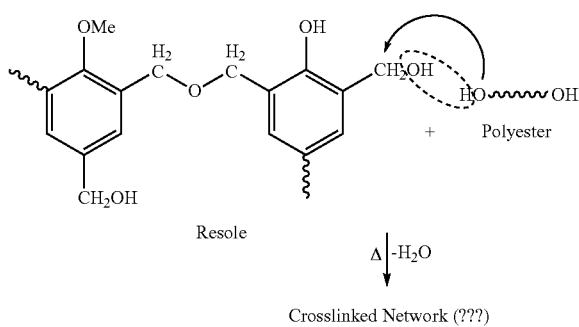

The present invention takes advantage of an additional reaction pathway that improves the crosslinking density of a coating. The present invention allows for the reaction of resole types of phenolic resins with the curable polyesters described below that surprisingly reacted quite well and provided coatings having good crosslink density as evidenced by the solvent resistance of the coatings. Without being bound to a theory, it is believed that the intermediate carbon between the carbonyl groups on the beta-ketoacetate moiety can act as a nucleophilic agent to attack the electrophilic site on the phenolic equilibrium intermediate (B) having dual nucleophilic and electrophilic sites or quinone methide having diene structure according to the following mechanism:

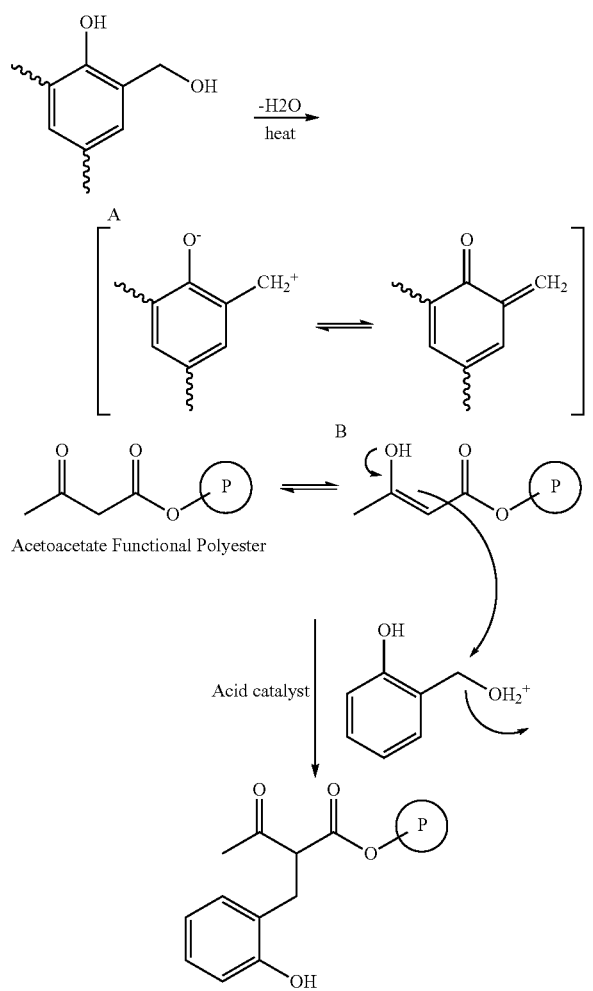

The preferred phenolic crosslinking agents for this invention are resole type phenolic resins containing at least 50 wt % or at least 60 wt. % or at least 70 wt. % or at least 80 wt. % or at least 90 wt. % of the residues of unsubstituted phenol and/or meta-substituted phenol, based on the total phenolic residues of the crosslinker resin.

The thermosetting composition also comprises a curable polyester (I) comprising beta-ketoacetate moieties that do not contain vinyl unsaturations. The curable polyester resin contains beta-ketoacetate moieties, e.g. the residues of beta-ketoacetate containing compounds. The beta-ketoacetate containing compounds are any compound having a beta-ketoacetate moiety in the compound and do not contain vinyl unsaturations. The beta-ketoacetate moiety, in the beta-ketoacetate containing compound and in the curable polyester, has a molecular formula of —COCHR'COO—, and can be represented by the general structure (Formula 1):

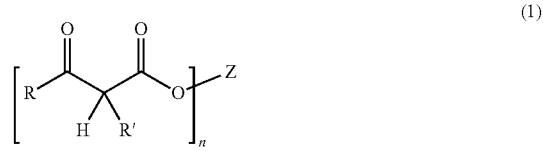

(1)

wherein R is a branched or straight chain, saturated or unsaturated alkyl, alicyclic, or aromatic group; R' is a hydrogen or a branched or straight chain, saturated or unsaturated alkyl, alicyclic, or aromatic group; Z is a branched or straight chain, saturated or unsaturated alkyl, alicyclic, or aromatic group, or is a polyester polymer residue, and wherein R does not contain a vinyl unsaturation.

When Z is a polyester residue, n represents the average number of beta-ketoacetate groups per polymer chain and is an average of at least 0.5. When the beta-ketoacetate moiety is in the beta-ketoacetate containing compound, n is equal to 1 and is represented by the structure below:

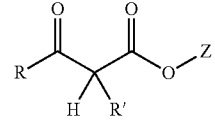

Desirably, R is a branched or straight chain alkyl group having 1-4 carbon atoms, R' is a hydrogen or a branched or straight alkyl having 1-4 carbon atoms; Z is a branched or straight chain alkyl having 1-8 carbon atoms or a polyester polymer residue, with n being an average within a range of 0.5-5.

The compounds or the curable polyester having beta-ketoacetate moiety groups may contain geometric or optical isomers as well as tautomers. It should be recognized that the presently described diketo groups can exist as tautomers in which the same compound can also be depicted as having a structure as shown in general structure below (Formula 2):

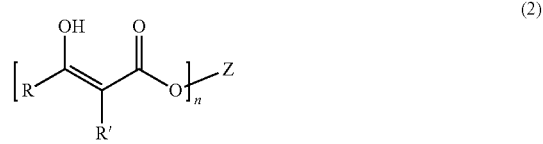

(2)

By naming and referring to a compound of formula 1 throughout the specification and claims, the tautomers thereof are also included such as those in Formula 2.

As already mentioned, there is provided a thermosetting composition comprising:
 I) a curable polyester resin comprising the reaction product of a polyester resin with a compound containing a beta-ketoacetate moiety that does not contain a vinyl unsaturation; and
 II) a phenolic resin substituted with at least one methylol group.

The acetoacetate-functionalized polyester resin comprises the reaction product of the polyester resin and the compound having a beta-ketoacetate moiety that does not contains a vinyl unsaturation, and can be represented by the general reaction shown as Formula 3:

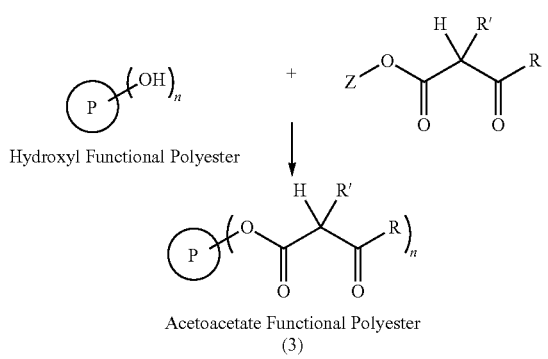

Hydroxyl Functional Polyester

Acetoacetate Functional Polyester
(3)

The reaction product described in Formula 3 is also described by Formula 1 when Z is a polymer residue. Typically, the reaction is driven by the removal of the alcohol by-product as it is formed. Although halides are traditionally utilized as leaving groups, the various acetoacetate esters are easier to handle and to store.

The compound having a beta-ketoacetate moiety desirably has a molecular weight of less than 500, or less than 400, or less than 300, or less than 200, or not greater than 175. As mentioned above, this compound does not contain vinyl unsaturation.

Suitable compounds for reaction with the polyester resin are those compounds containing a beta-ketoacetate moiety or those compounds represented by formulas 1 or 2. Examples of these compounds containing a beta-ketoacetate moiety that are suitable for reaction with (esterification or transesterification of) a hydroxyl-containing polyester are desirably alkyl acetoacetate compounds, such as but not limited to, t-butyl acetoacetate, ethyl acetoacetate, methyl acetoacetate, isobutyl acetoacetate, isopropyl acetoacetate, n-propyl acetoacetate, n-butyl acetoacetate, t-anyl acetotacetate, and diisopropyl carbinol acetoacetate. Preferred is the use of t-amyl acetoacetate or t-butyl acetoacetate.

The curably polyester (I) may be prepared by reacting a polyester resin containing hydroxyl groups, for example, a polymer having a hydroxyl number of at least 5, desirably about 30 to 200, with a compound having the beta-ketoacetate moiety or diketene. Various methods for the preparation of acetoacetylated polyester coating resins have been described by Witzeman et al. in the Journal of Coatings Technology, Vol. 62, No. 789, pp. 101-112 (1990). Suitable amounts of each in a reaction mixture include from about 60 to about 97, 70 to 97, 80 to 94, or 85 to 90 wt. % of the polyester resin and from about 3 to about 40, 3 to 30, 6 to 20, or 10 to 15 wt. % of the compound having a beta-ketoacetate moiety or a diketene can be reacted together, wherein the weight percents are based on the total weight of the polyester resin and the compound having the beta-ketoacetate moiety.

There is now also provided a thermosetting composition comprising:
I) a curable polyester resin comprising the reaction product of a polyester resin with a compound containing a beta-ketoacetate moiety that does not contain a vinyl unsaturation, said polyester resin comprising the reaction product of:

a) polyhydroxyl compounds comprising:
(i) diol compounds in an amount of 70 mole %-100 mole %; and
(ii) polyhydroxyl compounds having 3 or more hydroxyl groups in an amount of 0 to 30 mole %; wherein the mole % is based on 100% of all moles of polyhydroxyl compounds a); and
b) polycarboxyl compounds comprising polycarboxylic acid compounds, derivatives of polycarboxylic acid compounds, the anhydrides of polycarboxylic acids, or combinations thereof; and
II) a phenolic resin substituted with at least one methylol group.

The polyester used to react with the beta-ketoacetate containing compound is desirably made with, and/or contains the residues of:
a) polyhydroxyl compounds comprising:
(i) a diol in an amount of 70 mole %-100 mole %; and
(ii) a polyhydroxyl compound having 3 or more hydroxyl groups in an amount of 0 to 30 mole %, based on 100 mole % of all polyhydroxyl compounds a).

For purposes of calculating quantities, all compounds having at least one hydroxyl group are counted as polyhydroxyl compounds (a). Such compounds include, but are not limited to, mono-ols, diols, polyhydroxyl compounds having 3 or more hydroxyl groups, and for each of the foregoing, can be hydrocarbons of any chain length optionally containing ether groups such as polyether polyols, ester groups such as polyesters polyols, amide groups, amine groups, and anhydrides.

The polyester resin is desirably not an alkyd polyester resin, or desirably is not a polyester resin containing alkyd residues. In addition to or in the alternative, the polyester resin does not contain any residues of vinyl unsaturation containing compounds, such as acrylics, or desirably, is not made with any compound having a vinyl unsaturation.

The diols (a)(i) have 2 hydroxyl groups and can be branched or linear, saturated or unsaturated, aliphatic or cycloaliphatic $C_2$-$C_{20}$ compounds, the hydroxyl groups being primary, secondary, and/or tertiary, desirably primary. Desirably, the polyhydroxyl compounds are hydrocarbons and do not contain atoms other than hydrogen, carbon and oxygen. Examples of diols (a)(i) include 2,2,4,4-tetraalkyl-cyclobutane-1,3-diol (TACD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and the like.

The TACD compound can be represented by the general structure:

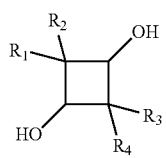

wherein $R_1$, $R_2$, $R_3$, and $R_4$ each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

Desirably, the diol (a)(i) is 2,2,4,4-tetramethylcyclobutane-1,3-diol (TMCD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof. Desirably, at least one of the diols (a)(i) is TMCD.

The diols (a)(i) are desirably present in an amount of at least 70 mole %, or at least 75 mole %, or at least 80 mole %, or at least 85 mole %, or at least 87 mole %, or at least 90 mole %, or at least 92 mole %, based on 100 mole % of all polyhydroxyl compounds. Additionally or in the alternative, the diols (a)(i) can be present in an amount of up to 100 mole %, or up to 98 mole %, or up to 96 mole %, or up to 95 mole %, or up to 93 mole %, or up to 90 mole %, based on 100 mole % of all polyhydroxyl compounds. Suitable ranges include, in mole % based on 100 mole % of all polyhydroxyl compounds (a), 70-100, or 75-100, or 80-100, or 85-100, or 87-100, or 90-100, or 92-100, or 95-100, or 96-100, or 70-98, or 75-98, or 80-98, or 85-98, or 87-98, or 90-98, or 92-98, or 95-93, or 96-93, or 70-93, or 75-93, or 80-93, or 85-93, or 87-93, or 90-93, or 92-93, or 70-90, or 75-90, or 80-90, or 85-90, or 87-90.

The diols (a)(i) are desirably present in an amount of at least 35 mole %, or at least 37 mole %, or at least 40 mole %, or at least 42 mole %, or at least 45 mole %, or at least 46 mole %, based on the total moles of the components of the polyester polymer. Additionally or in the alternative, the diols (a)(i) can be present in an amount of up to 50 mole %, or up to 49 mole %, or up to 48 mole %, or up to 47 mole %, or up to 46 mole %, or up to 45 mole %, based on the total moles of the components of the polyester polymer. Suitable ranges include, in mole % based on the total moles of the components of the polyester polymer, 35-50, or 37-50, or 40-50, or 42-50, or 45-50, or 46-50, or 35-49, or 37-49, or 40-49, or 42-49, or 45-49, or 46-49, or 35-48, or 37-48, or 40-48, or 42-48, or 45-48, or 46-48, or 35-47, or 37-47, or 40-47, or 42-47, or 45-47, or 46-47, or 35-46, or 37-46, or 40-46, or 42-46, or 45-46, or 35-45, or 37-45, or 40-45, or 42-45.

The polyhydroxyl compounds (a)(ii) having 3 or more hydroxyl groups can be branched or linear, saturated or unsaturated, aliphatic or cycloaliphatic $C_2$-$C_{20}$ compounds, the hydroxyl groups being primary, secondary, and/or tertiary, and desirably at least two of the hydroxyl groups are primary. Desirably, the polyhydroxyl compounds are hydrocarbons and do not contain atoms other than hydrogen, carbon and oxygen. Examples of the polyhydroxyl compounds (a)(ii) include 1,1,1-trimethylol propane, 1,1,1-trimethylolethane, glycerin, pentaerythritol, erythritol, threitol, dipentaerythritol, sorbitol, mixtures thereof, and the like.

The polyhydroxyl compounds (a)(ii), if present, can be present in an amount of at least 1 mole %, or at least 2 mole %, or at least 5 mole %, or at least 8 mole %, or at least 10 mole %, based on 100 mole % of all polyhydroxyl compounds (a). Additionally or in the alternative, the polyhydroxyl compounds (a)(ii) can be present in an amount of up to 30 mole %, or up to 25 mole %, or up to 20 mole %, or up to 15 mole %, or up to 13 mole %, or up to 10 mole %, or up to 8 mole %, based on 100 mole % of all polyhydroxyl compounds (a). Suitable ranges of the polyhydroxyl compounds (a)(ii) include, in mole % based on 100 mole % of all polyhydroxyl compounds (a), 1-30, or 2-30, or 5-30, or 8-30, or 10-30, or 1-25, or 2-25, or 5-25, or 8-25, or 10-25, or 1-20, or 2-20, or 5-20, or 8-20, or 10-20, or 1-15, or 2-15, or 5-15, or 8-15, or 10-15, or 1-13, or 2-13, or 5-13, or 8-13, or 10-13, or 1-10, or 2-10, or 5-10, or 8-10, or 1-8, or 2-8, or 5-8.

The polyhydroxyl compounds (a)(ii) are desirably present in an amount of at least 0.5 mole %, or at least 1 mole %, or at least 2 mole %, or at least 4 mole %, or at least 5 mole %, based on the total moles of the components of the polyester polymer. Additionally or in the alternative, the polyhydroxyl compounds (a)(ii) can be present in an amount of up to 15 mole %, or up to 13 mole %, or up to 10 mole %, or up to 8 mole %, or up to 6 mole %, or up to 5 mole %, or up to 4 mole %, based on the total moles of the components of the polyester polymer. Suitable ranges include, in mole % based on the total moles of the components of the polyester polymer, 0.5-15, or 1-15, or 2-15, or 4-15, or 5-15, or 0.5-13, or 1-13, or 2-13, or 4-13, or 5-13, or 0.5-10, or 1-10, or 2-10, or 4-10, or 5-10, or 0.5-8, or 1-8, or 2-8, or 4-8, or 5-8, or 0.5-6, or 1-6, or 2-6, or 4-6, or 5-6, or 0.5-5, or 1-5, or 2-5, or 4-5, or 0.5-4, or 1-4, or 2-4.

The mole % of the diol (a)(i) is desirably from 70 to 100, 80 to 97, or 85 to 95, and the mole % of the polyhydroxyl compound (a)(ii) is desirably from 0 to 30, 3 to 20, or 5 to 15.

Desirably, all of the polyhydroxyl compounds (a) used to react with the polycarboxylic compounds (b) are hydrocarbons, meaning that they contain only oxygen, carbon, and hydrogen. Optionally, none of the polyhydroxyl compounds (a) contain any ester, carboxyl (—COO—), and/or anhydride groups. Optionally, none of the polyhydroxyl compounds (a) have any carbonyl groups (—CO—). Optionally, none of the polyhydroxyl compounds (a) contain any ether groups. Desirably, the polyhydroxyl compounds (a) have from 2 to 20, or 2 to 16, or 2 to 12, or 2 to 10 carbon atoms.

The polycarboxyl compounds I(b) contain at least polycarboxylic acid compounds, derivatives of polycarboxylic acid compounds, the anhydrides of polycarboxylic acids, or combinations thereof. Suitable polycarboxylic acid compounds include compounds having at least two carboxylic acid groups. The polycarboxylic acid compounds are capable of forming an ester linkage with a polyhydroxyl compound. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride.

The polycarboxylic acid compounds I (b) can be a combination of aromatic polycarboxylic acid compounds and either or both of aliphatic or cycloaliphatic polycarboxylic acid compounds. For example, the polycarboxylic acid compounds I(b) can include aromatic polycarboxylic acid compounds and aliphatic polycarboxylic acids compounds having 2 to 22 carbon atoms; or aromatic polycarboxylic acid compounds and cycloaliphatic polycarboxylic acids compounds having 2 to 22 carbon atoms; or aromatic polycarboxylic acid compounds, aliphatic polycarboxylic acids compounds having 2 to 22 carbon atoms; and cycloaliphatic polycarboxylic acids compounds having 2 to 22 carbon atoms.

Examples of such polycarboxylic compounds I(b) that form the polycarboxylic I(b) residues in the curable polyester include those having two or more, desirably only two, carboxylic acid functional groups or their esters. Examples of these compounds include aliphatic dicarboxylic acids, alicyclic dicarboxylic acids, aromatic dicarboxylic acids, derivatives of each, or mixtures of two or more of these acids, or the $C_1$-$C_4$ ester derivatives thereof. Suitable dicarboxylic acids include, but are not limited to, isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, succinic anhydride, succinic acid, adipic acid, 2,6-naphthalenedicarboxylic acid, glutaric acid, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

Anhydride analogs to each of the polycarboxyl compounds I(b) described above can be used. This would include the anhydrides of polycarboxylic acids having at least two acyl groups bonded to the same oxygen atom. The anhydrides can be symmetrical or unsymmetrical (mixed) anhydrides. The anhydrides have at least one anhydride group, and can include two, three, four, or more anhydride groups. Specific examples of anhydrides of the dicarboxylic acids include, but are not limited to, maleic anhydride, maleic acid, fumaric acid, itaconic anhydride, itaconic acid, citraconic anhydride, citraconic acid, aconitic acid, aconitic anahydride, oxalocitraconic acid and its anhydride, mesaconic acid or its anhydride, beta-acylacrylic acid, phenyl maleic acid or its anhydride, t-butyl maleic acid or its anhydride, monomethyl fumarate, monobutyl fumarate, methyl maleic acid or its anhydride, or mixtures thereof.

Desirably, the polycarboxylic component I(b) includes isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, adipic acid, 2,6-naphthalenedicarboxylic acid, 1,4-naphthalenedicarboxylic acid; 2,5-naphthalenedicarboxylic acid; hexahydrophthalic anhydride, tetrahydrophthalic anhydride, trimellitic anhydride, succinic anhydride, succinic acid, or mixtures thereof. Trimellitic acid or its anhydride is a useful compound to add in order to increase the acid number of the curable polyester if so desired.

More specific examples of some of the suitable polycarboxylic acids Ib and/or combinations thereof include:
a) (isophthalic acid (or dimethyl isophthalate)) and (1,4-cyclohexanedicarboxylic acid, 1,3-cyclohexanedicarboxylic acid, or mixtures thereof); or
b) (isophthalic acid (or dimethyl isophthalate)) and (dodecanedioic acid, sebacic acid, azelaic acid, maleic acid, fumaric acid, succinic acid, adipic acid, glutaric acid, itatonic acid, diglycolic acid; or mixtures thereof); or
c) (isophthalic acid (or dimethyl isophthalate)); or (1,4-cyclohexanedicarboxylic acid, 1,3-cyclohexanedicarboxylic acid, or mixtures thereof) and (dodecanedioic acid, sebacic acid, azelaic acid, maleic acid, fumaric acid, succinic acid, adipic acid, glutaric acid, itatonic acid, diglycolic acid, or mixtures thereof), or
d) 1,4-cyclohexanedicarboxylic acid.

Optionally, terephthalic acid or derivatives thereof are not included as polycarboxylic acids I(b).

The curable polyester I can have an acid number ranging from 0 to about 120 mg KOH/g and a hydroxyl number ranging from greater than 0 to about 300 mg KOH/g.

The acid number of the curable polyester can be adjusted as needed depending on whether a water borne dispersion or solvent borne solution is ultimately desired.

The acid number of the curable polyester resin (I) is not particularly limited. The acid number may range from 0 to about 120 mgKOH/g. The acid number may vary depending on the application. For example, the desirable acid number for waterborne coating application is about 50 to about 100 to impart sufficient water dispersibility after neutralization, whereas the desired acid number for solvent-based coating application is 0 to about 10 for better solubility and lower solution viscosity.

The hydroxyl number of the polyester resin used to make the curable polyester resin (I) can be within a range of from greater than 0 to 300 mg KOH/g. Suitable ranges of hydroxyl number include greater than 0 to 300, or from 10 to 300, or from 30 to 300, or from 50 to 300, or from 60 to 300, or from 80 to 300, or from 100 to 300, or from 120 to 300, or from 140 to 300, or from 160 to 300, or from 180 to 300, or greater than 0 to 260, or from 10 to 260, or from 30 to 260, or from 50 to 260, or from 60 to 260, or from 80 to 260, or from 100 to 260, or from 120 to 260, or from 140 to 260, or from 160 to 260, or from 180 to 260, greater than 0 to 240, or from 10 to 240, or from 30 to 240, or from 50 to 240, or from 60 to 240, or from 80 to 240, or from 100 to 240, or from 120 to 240, or from 140 to 240, or from 160 to 240, or from 180 to 240, or greater than 0 to 220, or from 10 to 220, or from 30 to 220, or from 50 to 220, or from 60 to 220, or from 80 to 220, or from 100 to 220, or from 120 to 220, or from 140 to 220, or from 160 to 220, or from 180 to 220 or greater than 0 to 200, or from 10 to 200, or from 30 to 200, or from 50 to 200, or from 60 to 200, or from 80 to 200, or from 100 to 200, or from 120 to 200, or from 140 to 200, or from 160 to 200, or from 180 to 200 or greater than 0 to 180, or from 10 to 180, or from 30 to 180, or from 50 to 180, or from 60 to 180, or from 80 to 180, or from 100 to 180, or from 120 to 180, or from 140 to 180, or from 160 to 180, or greater than 0 to 160, or from 10 to 160, or from 30 to 160, or from 50 to 160, or from 60 to 160, or from 80 to 160, or from 100 to 160, or from 120 to 160, or from 140 to 160 mgKOH/g.

Desirably, the hydroxyl number of the polyester resin is high to increase the number of sites for reaction with the beta-ketoacetate containing compound. Accordingly, the hydroxyl number of the polyester resin is desirably at least 30, or at least 50, or at least 80 mgKOH/g.

Desirably, the acid number of the curable polyester resin (I) is not more than 30, or not more than 25, or not more than 20, or not more than 15, or not more than 10, or not more than 8, or not more than 5 mgKOH/g.

The acid number mentioned herein can be measured by ASTM D1639-90 test method. The hydroxyl numbers mentioned herein can be measured by the ASTM D4274-11 test method.

The glass transition temperature (Tg) of the curable polyester of the present invention may be from −40° C. to 120° C., from −10° C. to 100° C., from 10° C. to 80° C., from 10° C. to 60° C., from 10° C. to 50° C., from 10° C. to 45° C., from 10° C. to 40° C., from 20° C. to 80° C., from 20° C. to 60° C., from 20° C. to 50° C., from 30° C. to 80° C., from 30° C. to 70° C., from 30° C. to 60° C., from 30° C. to 50° C., or from 35° C. to 60° C. The Tg is measured on the dry polymer using standard techniques, such as differential scanning calorimetry ("DSC"), well known to persons skilled in the art. The Tg measurements of the polyesters are conducted using a "dry polymer," that is, a polymer sample in which adventitious or absorbed water is driven off by heating to polymer to a temperature of about 200° C. and allowing the sample to return to room temperature. Typically, the polyester is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement.

The number average molecular weight (Mn) of the curable polyester (I) of the present invention is not limited, and may be from 1,000 to 20,000, from 1,000 to 15,000, from 1,000 to 12,500, from 1,000 to 10,000, from 1,000 to 8,000, from 1,000 to 6,000, from 1,000 to 5,000, from 1,000 to 4000, from 1,000 to 3,000, from 1,000 to 2,500, from 1,000 to 2,250, or from 1,000 to 2,000, from 1,100 to 4000, from 1,100 to 3,000, from 1,100 to 2,500, from 1,100 to 2,250, or from 1,100 to 2,000 in each case g/mole. The Mn is measured by gel permeation chromatography (GPC) using polystyrene equivalent molecular weight.

The weight average molecular weight (Mw) of the curable polyester (I) can be from 1,000 to 100,000; from 1,500 to 50,000; and desirably is from 2,000 to 10,000 or from 2,500 to 5,000 g/mole. The polyester may be linear or branched.

This curable polyester (I) desirably has a low molecular weight, typically an Mn from 1000 to about 5,000 to render it suitable for coating applications. Desirably, the molecular weight of the curable polyester resin (I) is not suitable for the fabrication of films, sheets, and other shaped objects by extrusion, casting, blow molding, and other thermoforming processes commonly used for higher molecular weight thermoplastic polymers.

The curable polyester 1 desirably is not obtained by a compound having vinyl unsaturations. Additionally or in the alternative, the curable polyester (I) itself does not contain vinyl unsaturations.

Desirably, in any of the embodiments of the invention, the (a)(i) diol includes 2,2-dimethyl-1,3-propanediol (neopentyl glycol); 1,2-cyclohexanedimethanol; 1,3-cyclohexanedimethanol; 1,4-cyclohexanedimethanol; 2-methyl-1,3-propanediol; TMCD; 2,2,4-trimethyl-1,3-pentanediol; hydroxypivalyl hydroxypivalate; 2-butyl-2-ethyl-1,3-propanediol; 1,4-butanediol; 1,6-hexanediol; or combinations thereof.

Desirably, in any of the embodiments of the invention, the (a)(ii) polyhydroxyl compound having 3 or more hydroxyl groups include 1,1,1-trimethylol propane, 1,1,1-trimethylolethane, glycerin, pentaerythritol, or combinations thereof.

Desirably, in any of the embodiments of the invention, the I(b) compounds include isophthalic acid (or dimethyl isophthalate), 1,4-cyclohexanedicarboxylic acid, 1,3-cyclohexanedicarboxylic acid, adipic acid; phthalic acid; or combinations thereof.

The curable polyester I can be prepared by any conventional process for the preparation of polyesters. For example, the polyester resin can be prepared by combining polyhydroxyl compounds (a) with the polycarboxyl compounds (b) in a reaction vessel under heat to form a reaction mixture comprising the curable polyester I in a batch or continuous process and in one or more stages, optionally with the continuous removal of distillates and applied vacuum during at least part of the residence time. Polyhydroxyl compounds (a) and polycarboxyl compounds (bi) are combined and reacted in at least one reactor at a temperature from 180-250° C., optionally in the presence of an acid catalyst. Desirably, a distillate is removed from the reactor.

The process for the manufacture of the polyester resin can be batchwise or continuous. The reaction of the polyhydroxyl compounds (a) and the polycarboxyl compounds (b) may be carried out in a melt phase process using conventional polyester polymerization conditions. The polyhydroxyl compounds and polycarboxylic acid compounds are combined to form a reaction mixture, and the reaction mixture is reacted in an esterification reactor at a temperature from 180-250° C. The esterification reaction many take place in one or more esterification reactors. The polyester composition can be made by a transesterification (ester interchange) reaction or by direct esterification. For example, polycarboxylic acid compounds (for direct esterification) or ester forms of the polycarboxylic acid compounds (for transesterification), and the polyhydroxyl compounds can be fed to an esterification reactor either in a combined stream, separate streams, or a combination of a combined and separate stream, and reacted at elevated temperatures, typically, from about 180° C. to about 250° C. While temperatures in excess of 250° C. can be employed, such as temperature up to 280° C., in many instances color bodies and degradation products start to form at temperatures exceeding 250° C. Desirably, the reaction mixture is reacted at any temperature within a range from about 180° C. to about 230° C. In the esterification reactor, the temperature of the reaction mixture to form the polyester intermediate composition may be static or may be increased stepwise or continuously if desired.

It is desirable to start the reaction at a temperature below 210° C., or at 200° C. or less, or even at 180° C. or less, and increase the temperature over the total residence time of the reaction mixture for making the polyester intermediate composition in order to avoid generating more water by-product than the distillate collection system can efficiently remove. To assist driving the reaction of the polyhydroxyl component and acid component to completion, it is desirable to react about 1.05 to about 1.6, or 1.1-1.5, or 1.1-1.4 equivalents of polyhydroxyl compounds (a) to one equivalent of the polycarboxylic acid compounds (b). Desirably, a distillate is removed from the reactor. The esterification reactor should be equipped with, and the process for making the polyester intermediate composition operated with, a distillate collection system for removing esterification or ester-exchange vapor by-products since their removal will assist with shifting the equilibrium reaction to the formation of the ester. The typical by-products formed in esterification are water in direct esterification routes, alcohols in transesterification routes, along with other reaction by-products such as aldehydes and color bodies.

The method for the removal of reaction by-products is not limited. A common method for the removal of esterification reaction by-products is a vacuum system connected to the esterification reaction zone in the reactor with a direct contact spray condenser, which is useful when a vacuum is applied to the esterification reaction zone in the esterification reactor, or a distillation column that is packed or contains trays in vapor communication with the esterification vessel for the separation of water from other reaction by-products.

The process for making the polyester resin can be conducted under a pressure within a range of 0 psig or atmospheric to about 200 psig, or from about 0 psig to about 100 psig, or from 0 psig to 40 psig. However, if desired, at least a portion or the entire residence time of the reaction to make the polyester composition can proceed under a vacuum, especially during polycondensation. If a vacuum is applied to only a portion of the residence time, it can be applied starting when at least 30%, or at least 50%, or at least 75%, or at least 80%, or at least 90% of the residence time for making the polyester resin. By applying a vacuum, the removal of water or alcohol condensate can be further enhanced, and the molecular weight Mn of the polyester can be increased. If a vacuum is applied, suitable pressures can range from 759 torr down to 0.5 torr, or 600 torr down to 0.5 torr, or 450 torr down to 0.5 torr. Vacuum can be increased with the residence time of the reaction mixture. Alternatively or in addition to the application of a vacuum, the removal of the reaction by-products can be purged or swept with an inert gas during all or a portion of the reaction. An inert gas is any gas which does not cause unwanted reaction or product characteristics at reaction conditions. Suitable gases include, but are not limited to, carbon dioxide, argon, helium, and nitrogen.

At a point when a desired Mn of the polyester resin is achieved, the compound containing the beta-ketoacetate moiety can be added to the reaction mixture containing the polyester resin. As mentioned above, the amount of the compound having a beta-ketoacetate moiety added to a reaction vessel can be from 3 to about 40, 3 to 30, 6 to 20, or 10 to 15 wt. % based on the weight of the reaction mixture the polyester resin is not first isolated or based on the weight of the polyester resin if isolated. Additionally or in the alternative, the amount of compound having a beta-ketoacetate moiety added to the polyester resin or reaction mixture is sufficient to consume at least 20%, or at least 30%, or at least 40%, or at least 50%, or at least 60%, or at least 70%, or at least 80%, or at least 90%, or at least 95%, or at least 99% of the hydroxyl groups on the polyester resin. Desirable, at least 70%, or at least 80%, or at least 90%, or at least 95% of the hydroxyl groups are consumed.

The reaction for making the polyester resin does not have to be discontinued after the desired molecular weight is achieved, and can be continued with the addition of the compound having the beta-ketoacetate moiety. Alternatively the reaction can be discontinued, the polyester resin solidified, and subsequently re-melted and reacted with the compound having the beta-ketoacetate moiety. If the compound having the beta-ketoacetate moiety is added to a reaction mixture containing the polyester resin without first isolating and solidifying the polyester resin, it is desirably added when at least 80%, or at least 90%, or at least 95% of the actual Mn of the curable polyester resin is obtained. Adding diketene or the beta-ketoacetate containing compound to a reaction mixture before the target Mn of the polyester resin is obtained results in the consumption of diketene or the beta-ketoacetate containing compound with free diols/polyhydroxyl compounds that have not yet reacted. Accordingly, it is desirable to add the compound having the beta-ketoacetate moiety to a polyester resin composition having less than 1 wt. %, or less than 0.5 wt %, or less than 0.1 wt. %, or less than 0.01 wt. % unreacted diols (a)(i) or polyhydroxyl compounds (a)(ii), based on the weight of the polyester resin composition or the reaction mixture.

Desirably, the process of the invention melts a polyester resin and combines the molten polyester resin with the compound containing the beta-ketoacetate moiety to form a reaction mixture in a reaction zone. The reaction mixture can be reacted in the presence of a catalyst at a temperature ranging from 100 to 150° C., desirably from 120 to 140° C. The pressure in the reaction zone can be from 0 psig or atmospheric to about 200 psig, or from about 0 psig to about 100 psig, or from 0 psig to 40 psig. However, if desired, at least a portion or the entire residence time of the reaction to make the curable polyester composition can proceed under a vacuum, such as from 759 torr down to 0.5 torr, or 600 torr down to 0.5 torr, or 450 torr down to 0.5 torr. Vacuum can be increased with the residence time of the reaction mixture. Alternatively or in addition to the application of a vacuum, the removal of the reaction by-products can be purged or swept with an inert gas during all or a portion of the reaction. An inert gas is any gas which does not cause unwanted reaction or product characteristics at reaction conditions. Suitable gases include, but are not limited to, carbon dioxide, argon, helium, and nitrogen. As with the esterification vessel used to make the polyester resin, the reactor used to make the curable polyester can be equipped with a means for removing the distillate alcohols continuously during the course of at least a portion of the reaction.

The catalyst can be an acid catalyst. A typical catalyst is an organometallic acid catalyst, such as, for example, a carboxylate of tin, e.g. butylstannoic acid The curable polyester resin can be made in the same vessel as the vessel used to make the polyester resin.

Each of the esterification vessels can be agitated if desired to assist with the mass transfer of reactants and disengagement of reaction by-products.

The reaction to make the polyester is facilitated by reacting the polyhydroxyl compounds (a) and the polycarboxylic acid compounds (b) in the presence of appropriate catalysts such as, for example, alkoxy titanium compounds, alkali metal hydroxides and alcoholates, salts of organic carboxylic acids, alkyl tin compounds, metal oxides, and other metal carboxylates or benzoates such as zinc, manganese, or magnesium acetates or benzoates. A typical catalyst is an organometallic acid catalyst, such as, for example, a carboxylate of tin, e.g. butylstannoic acid. The amount of the catalyst added may be determined by routine experimentation as understood by those skilled in the art. The catalyst can be added in amounts ranging from about 0.01 to 1.0 weight percent, based on the total weight of the reactants.

In a continuous process, the polycarboxylic acid compounds and the polyhydroxyl compounds are continuously fed to the esterification reactor, the polyester resin composition is continuously withdrawn from the esterification reactor and fed to a second esterification reactor continuously to form the curable polyester composition, and the curable polyester composition is continuously withdrawn from the second esterification reactor.

Additives can be added to the reactor or reaction mixture to enhance the performance properties of the curable polyester polymer. For example, crystallization aids, impact modifiers, surface lubricants, denesting agents, stabilizers, antioxidants, ultraviolet light absorbing agents, metal deactivators, colorants, nucleating agents, acetaldehyde lowering compounds, reheat rate enhancing aids such as elemental antimony or reduced antimony or reducing agents to form such species in situ, silicon carbide, carbon black, graphite, activated carbon, black iron oxide, red iron oxide and the like, sticky bottle additives such as talc, and fillers and the like can be included. All of these additives and many others and their use are well known in the art and do not require extensive discussion. Any of these compounds can be used in the present composition.

The thermosetting composition desirably contains (I) a curable polyester resin in an amount of 5 to 95, or 10 to 90, or 20 to 85, or 30 to 80, or 35 to 75 weight % based on the total weight of (I) and (II). Desirably, the thermosetting composition desirably contains (I) a curable polyester resin in an amount of 30 to 80 weight %, or 35 to 75, or 45-60 wt. % based on the weight of (I) and (H).

There is also provided a solvent containing (as distinguished from an aqueous based coating) coating composition, comprising:
  I. the curable polyester resin of the present invention,
  II. a crosslinker comprising a resole phenolic resin, and
  III. an organic solvent.

Suitable organic solvents for the solvent-based coating composition include xylene, ketones (for example, methyl amyl ketone), 2-butoxyethanol, ethyl-3-ethoxypropionate, toluene, butanol, cyclopentanone, cyclohexanone, ethyl acetate, butyl acetate, and other volatile inert solvents typically used in industrial baking (i.e., thermosetting) enamels, mineral spirits, naptha, toluene, acetone, methyl ethyl ketone, methyl isoamyl ketone, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, 2,2,4-trimethyl-1,3-pentanediol monoisobutyrate (available commercially from Eastman Chemical Company under the trademark TEXANOL™), or combinations thereof. The coating composition also may comprise reactive solvents such as, for example, diallyl phthalate, SANTOLINK™ XI-100 polyglycidyl allyl ether (available from Cytec), and others as described, for example, in U.S. Pat. Nos. 5,349,026 and 5,371,148.

The amount of solvent (other than water) is desirably at least 20 wt %, or at least 25 wt. %, or at least 30 wt. %, or at least 35 wt. %, or at least 40 wt. %, or at least 45 wt. %, or at least 50 wt. %, or at least 55 wt. % based on the weight of the solvent containing coating composition. Additionally or in the alternative, the amount of organic solvent can be up to 85 wt. % based on the weight of the coating composition. Solvent containing coating compositions desirably contain 10 wt. % or less, or 8 wt. % or less, or 5 wt. % or less, or 3 wt. % or less water, based on the weight of the coating composition.

The solvent containing composition is desirably a solution in which the curable polyester is dissolved or solubilized in the solvent. While other solids can be present in the solvent containing composition (and typically are in a fully formulated or pigmented coating composition), the solvent containing composition desirably has less than 3 wt. % curable polyester resin as solid particles, or less than 1 wt. % curable polyester resin as solid particles, or not more than 0.5 wt. % polyester resin as solid particles, based on the total weight of the curable polyester (a).

There is further provided an aqueous dispersion, comprising:
  I. the curable polyester resin of the present invention at least partially neutralized with a neutralizing agent,
  II. a crosslinker comprising a resole phenolic resin, and
  III. water.

The amount of water is desirably at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. % based on the weight of the aqueous dispersion.

The neutralizing agent may be an amine or an inorganic base. Typical amines include ammonia, trimethylarnine, diethylamine, monoethanolamine, monoisopropanolamine, morpholine, ethanolamine, diethanolamine, triethanolamine, N,N-dimethylethanolamine, N, N-diethylethanolamine, N-methyldiethanolamine and the like.

Typical inorganic bases include bases derived from alkali metals and alkaline earth metals such as, for example, sodium, potassium, magnesium, calcium, and other basic metal compounds. Suitable bases from this first class of bases useful in the present invention include, but are not limited to, sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, and sodium pyrophosphate.

The aqueous dispersion of this invention may and desirably further comprise an organic co-solvent. Suitable co-solvents include ethanol, n-propanol, propanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents. If an organic co-solvent is used, the amount is desirably 40 wt. % or less, or 30 wt. % or less, or 15 wt. % or less, or 10 wt. % or 5 wt. % less based on the weight of the aqueous composition, and at least 1 wt. %, or at least 3 wt. % based on the weight of the aqueous composition.

Aqueous dispersions of the polyesters of the present invention are typically prepared by dispersing the curable polyester resins with water in the presence of organic co-solvent(s) (e.g. at least 1 or 3 wt. % and up to 15 wt. % based on the weight of the polyester polymers), at a temperature ranging from about 60 to about 95° C. under ambient pressure. The dispersing process may be carried out either by gradually adding the resin to the heated mixture of water, the neutralizing agent, and the co-solvent(s) or by gradually adding water and the neutralizing agent to the heated mixture of the resin and the co-solvent(s). The former method is preferred for resins with a high Tg (e.g. >60° C.), which can be pulverized, for example, by using a blender and subsequently added to the heated water and the neutralizing agent. For resins with a lower Tg, it is preferred to add water and the neutralizing agent to the heated resin mixture containing the co-solvent. After the completion of adding either resin or water, the stirring is allowed to continue until a homogeneous dispersion is obtained. The process typically takes one or several hours. It is intended for this terminology to include conditions where the polyester is dissolved to form a true solution as well as those where the polyester is dispersed within the aqueous medium. Often, due to the statistical nature of polyester compositions, it is possible to have a soluble fraction and a dispersed fraction when a single polyester sample is placed in an aqueous medium.

Desirably, the dispersion contains up to 80 wt. %, or up to 60 wt. %, or up to 50 wt. %, or up to 40 wt. % curable polyester resin. Suitable ranges of curable polyester resin in wt. % based on the weight of the dispersion include 3-80, or 5-80, or 10-80, or 5-80, or 10-80, or 15-80, or 20-80, or 25-80, or 30-80, or 3-60, or 5-60, or 10-60, or 5-60, or 10-60, or 15-60, or 20-60, or 25-60, or 30-60, or 3-50, or 5-50, or 10-50, or 5-50, or 10-50, or 15-50, or 20-50, or 25-50, or 30-50, or 3-45, or 5-45, or 10-45, or 5-45, or 10-45, or 15-45, or 20-45, or 25-45, or 30-45.

Curable polyester resins having glass transition temperature (Tg) greater than about 50° C. are suitable for powder coating application. The polyester of the present invention comprises TACD, which is capable of providing higher Tg.

Thus, there is further provided a curable powder coating composition comprising:

I. the curable polyester resin of the present invention having a Tg greater than about 50° C. and, II. a crosslinker comprising a resole phenolic resin.

Whether a solvent based, water borne, or powder coating composition is provided, crosslinking compounds other than the phenolic (II) resins can be used in combination with the phenolic (II) resins. These include the amino, epoxide, and isocyanate based crosslinkers. The amino resin crosslinker (or cross-linking agent) can be a melamine-formaldehyde type cross-linking agent, i.e., a cross-linking agent having a plurality of —N(CH2OR3)2 functional groups, wherein R3 is C1-C4 alkyl, preferably methyl. The amino cross-linking agent may also be a modified melamine-formaldehyde type resin such as toluene sulfonamide modified melamine-formaldehyde resins, and the like.

In general, the amino cross-linking agent may be selected from compounds of the following formulae, wherein $R^3$ is independently $C_1$-$C_4$ alkyl:

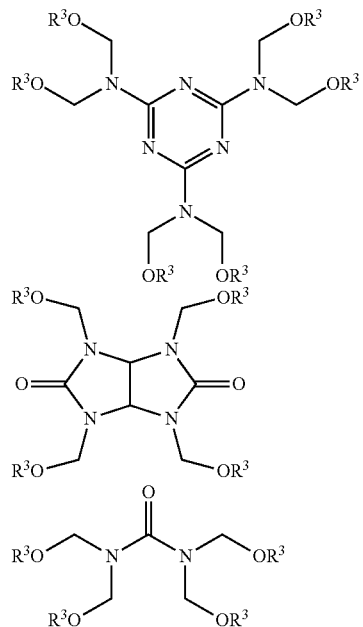

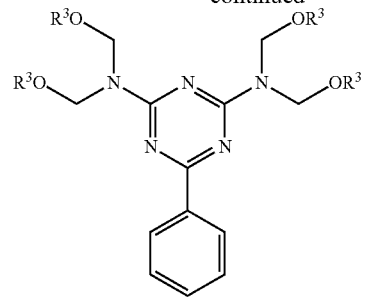

The amino containing cross-linking agents are desirably hexamethoxymethylmelamine, tetramethoxymethylbenzoguanamine, tetramethoxymethylurea, mixed butoxy/methoxy substituted melamines, and the like. Alternatively, a toluene sulfonamide methylated melaminformaldehyde resin powder may be utilized as a cross-linking agent.

The crosslinking agent may also be blocked or non-blocked isocyanate type. Examples of suitable isocyanate crosslinking agents include, but are not limited to, 1,6-hexamethylene diisocyanate, methylene bis (4-cyclohexyl isocyanate), isophorone diisocyanate, 2,4-toluene diisocyanate, and Bayhydur® 302 (BAYER MaterialScience).

The crosslinking agent can be an epoxidized phenolic resin type. An example is the reaction product of epichlorohydrin and phenol-formaldehyde novolac such as D.E.N.-431, -438, -439, or D.E.R. 354 available from Dow Chemical Company.

In the case of thermosetting powder coating compositions, the cross-linking agents can be cross-linking compounds with epoxy groups such as triglycidyl isocyanurate. Desirable epoxy functional compounds generally have a molecular weight of about 300 to about 4000, and have approximately 0.05 to about 0.99 epoxy groups per 100 g of resin (i.e., 100-2000 weight per epoxy (WPE)). Such resins are widely known and are commercially-available under EPON™ trade name available from MOMENTIVE.

Additionally, the present inventors have surprisingly found that when a combination of resole phenolic resin and amino resin is used for curing with the polyester of the invention, the resulting cured coating films exhibit much less color than those with only phenolic resin as the crosslinker. Thus, there is further provided a crosslinking system comprising a resole phenolic resin and an amino resin.

Desirably, the cross-linker composition contains greater than 50 wt. % or greater than 60 wt. % or greater than 70 wt. % or greater than 80 wt. % or greater than 90 wt. % resole phenolic resin, based on the weight of all cross-linker compounds. In addition to or in the alternative, the remainder of the cross-linking compounds in the cross-linking composition are amine based crosslinking compounds as described above.

The compositions of the invention can also include one or more cross-linking catalysts. Representative crosslinking catalysts include from carboxylic acids, sulfonic acids, tertiary amines, tertiary phosphines, tin compounds, or combinations of these compounds. Some specific examples of crosslinking catalysts include p-toluenesulfonic acid, the NACURE™ 155, 5076, and 1051 catalysts sold by King Industries, BYK 450, 470, available from BYK-Chemie U.S.A., methyl tolyl sulfonamide, p-toluenesulfonic acid, dodecylbenzene sulfonic acid, dinonylnaphthalene sulfonic acid, and dinonylnaphthalene disulfonic acid, benzoic acid, triphenylphosphine, dibutyl-tindilaurate, and dibutyltindiacetate.

The crosslinking catalyst can depend on the type of crosslinker that is used in the coating composition. For example, the crosslinker can comprise an epoxide, and the crosslinking catalyst can comprise at least one compound chosen from p-toluenesulfonic acid, benzoic acid, tertiary amines, and triphenylphosphine. In another example, the crosslinker can comprise a melamine or "amino" crosslinker and the crosslinking catalyst can comprise p-toluenesulfonic acid, unblocked and blocked dodecylbenzene sulfonic (abbreviated herein as "DDBSA"), dinonylnaphthalene sulfonic acid (abbreviated herein as "DNNSA") and dinonylnaphthalene disulfonic acid (abbreviated herein as "DNNDSA"). Some of these catalysts are available commercially under trademarks such as, for example, NACURE™ 155, 5076, 1051, and 5225 (available from King Industries), BYK-CATALYSTS™ (available from BYK-Chemie USA), and CYCAT™ catalysts (available from Cytec Surface Specialties). The coating compositions of the invention can comprise one or more isocyanate crosslinking catalysts such as, for example, FASCAT™ 4202 (dibutyltindilaurate), FASCAT™ 4200 (dibutyltindiacetate, both available from Arkema), DABCO™ T-12 (available from Air Products) and K-KAT™ 348, 4205, 5218, XC-6212™ non-tin catalysts (available from King Industries), and tertiary amines.

The thermosetting composition can contain an acid or base catalyst in an amount ranging from 0.1 to 2 weight %, based on the total weight of curable polyester (I) and phenolic resin (II).

The compositions of the invention can also contain one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antiloaming agents; anti-settling, anti-sag and bodying agents; anti-skinning agents; anti-flooding and anti-floating agents; fungicides and mildewicides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™, available from Henkel Corporation Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

The coating composition may also comprise at least one pigment. Typically, the pigment is present in an amount of about 20 to about 60 weight percent, based on the total weight of the composition. Examples of pigments include those generally recognized by persons of ordinary skill in the art of surface coatings. For example, the pigment may be a typical organic or inorganic pigment, especially those set forth in the Colour Index, 3rd ed., 2nd Rev., 1982, published by the Society of Dyers and Colourists in association with the American Association of Textile Chemists and Colorists. Other examples of suitable pigments include titanium dioxide, barytes, clay, calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Colorants such as, for example, phthalocyanine blue, molybdate orange, or carbon black also may be added to the coating composition. For example, the solventborne, thermosetting coating formulations can contain titanium dioxide as the pigment.

After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 µm), or 0.5 to 3, or 0.5 to 2, or 0.5 to 1 mils on the substrate. The coating can be cured at ambient (room) temperature or heated to a temperature of about 50° C. to about 230° C., or desirably from 150° C. to 230° C., for a time period that typically ranges about 5 to about 90 minutes and allowed to cool. Further examples of typical application and curing methods can be found in U.S. Pat. Nos. 4,737,551 and 4,698,391 and 3,345,313.

The invention is further illustrated by the following examples.

EXAMPLES

Example 1

Synthesis of Acetoacetate Functional Polyester (Curable Polyester Resin 1)

Hydroxyl Functional Polyester 1:

A 500 mL, three-neck, round-bottom flask was equipped with a mechanical stirrer, a heated partial condenser, a Dean-Stark trap, and a water condenser. To the flask were charged 2,2,4,4-tetramethyl-13-cyclobutanediol (TMCD) (376.9 g); trimethylolpropane (TMP) (16.66 g); isophthalic acid (IPA) (232.6 g); adipic acid (AD) (87.7 g), and the acid catalyst, Fascat-4100 (Arkema Inc.) (1.07 g). The reaction was allowed to react under nitrogen at 180° C. for 30 min., at 200° C. for 45 min., at 220° C. for 90 min., and at 230° C. for about 2 hours to yield a clear, viscous mixture. A total of 72.5 mL of distillate was collected in the Dean-Stark trap. The resulting mixture was allowed to cool to room temperature and subsequently collected (612 g). Acid number: <1.0 mgKOH/g; hydroxyl number: 113.4 mgKOH/g; glass transition temperature (Tg): 39.2° C.; number average molecular weight (Mn): 1459; weight average molecular weight (Mw): 2673.

Curable Polyester 1:

To a 500 mL, three-neck, round-bottom flask equipped with a mechanical stirrer, a heated partial condenser, a Dean-Stark trap, and a water condenser were added the above hydroxyl-functional polyester 1 (80.0 g) and t-butyl acetoacetate (6.75 g). The mixture was gradually heated and allowed to react at 120° C. for 40 minutes and at 140° C. for two hours. A total of 2.5 ml of the condensate (t-butanol) was collected in the Dean-Stark adapter. The resulting viscous resin was allowed to cool and subsequently collected. Glass transition temperature (Tg): 33.1° C.; number average molecular weight (Mn): 1526; weight average molecular weight (Mw): 2723.

Example 2

Synthesis of Acetoacetate Functional Polyester (Curable Polyester Resin 2)

To a 500 mL, three-neck, round-bottom flask equipped with a mechanical stirrer, a heated partial condenser, a Dean-Stark trap, and a water condenser were added the above hydroxyl-functional polyester 1 (80.0 g) and t-butyl acetoacetate (11.27 g). The mixture was gradually heated and allowed to react at 120° C. for 50 minutes and at 140° C. for two hours. A total of 5.5 ml of the condensate (t-butanol) was collected in the Dean-Stark adapter. The resulting viscous resin was allowed to cool and subsequently collected. Glass transition temperature (Tg): 28.4° C.; number average molecular weight (Mn): 1550; weight average molecular weight (Mw): 2752.

Example 3

Synthesis of Acetoacetate Functional Polyester (Curable Polyester Resin 3)

To a 500 mL, three-neck, round-bottom flask equipped with a mechanical stirrer, a heated partial condenser, a Dean-Stark trap, and a water condenser were added the above hydroxyl-functional polyester 1 (80.0 g) and t-butyl acetoacetate (15.77 g). The mixture was gradually heated and allowed to react at 120° C. for 25 minutes and at 140° C. for 2.5 hours. A total of 7.5 ml of the condensate (t-butanol) was collected in the Dean-Stark adapter. The resulting viscous resin was allowed to cool and subsequently collected. Glass transition temperature (Tg): 23.5° C.; number average molecular weight (Mn): 1575; weight average molecular weight (Mw): 2765.

Example 4

Formulation and Evaluation of Curing of Curable Polyester Resins 1-3

Formulation A (polyester/phenolic=50/50):

Resin solutions (40% solids) were prepared by dissolving curable polyester resins 1-3 respectively in xylene. Formulations were then prepared by mixing each resin solution (6.25 g) with Phenodur PR516/60B (available from Allnex) (4.17 g, 60% in n-butanol) and p-toluenesulfonic acid (pTSA) (0.625 g, 4% in isopropanol).

Formulation B (polyester/phenolic/melamine=70/20/10):

Resin solutions (40% solids) were prepared by dissolving resins 1-3 respectively in xylene. Formulations were then prepared by mixing each resin solution (8.75 g) with Phenodur PR516/60B (available from Allnex) (1.67 g, 60% in n-butanol), Cymel 303 (Allnex) (0.5 g), and p-toluenesulfonic acid (pTSA) (0.625 g, 4% in isopropanol).

Formulation C (polyester/phenolic=70/30):

Resin solutions (40% solids) were prepared by dissolving resins 1-3 respectively in xylene. Formulations were then prepared by mixing each resin solution (8.75 g) with Phenodur PR516/60B (available from Allnex) (2.5 g, 60% in n-butanol) and p-toluenesulfonic acid (pTSA) (0.625 g, 4% in isopropanol).

Evaluation of Curing:

Each of the above formulations was drawn down on a Bonderite 1000 cold-rolled steel test panel (ACT Test Panel Technologies) using a drawdown bar. One set of the coated panels was then baked at 200° C. for 5 min, and the other set baked at 160° C. for 30 min. The baked panels (dried film thickness: about 20 μm) were then evaluated for curing by MEK double rubs (ASTM D4752). All panels were stopped at 100 double rubs and visually inspected for their effects. It was found that all coatings showed various degrees of mars with the most effect on two ends. Those cured at 200° C. for 5 min. were slightly better than those at 160° C. for 30 min. The following trend was observed:

Degree of mars: Formulations A>C>B

Degree of mars for formulation B: Curable Polyester Resins 1>2>3

Degree of mars for formulation C: Curable Polyester Resins 1>2≥3

In addition, it was found that those with 10% melamine in the formulation had significantly lower color (yellow) than those with phenolic resin only (brown). Two comparative formulations were prepared using hydroxyl functional polyester 1 and the phenolic resin according to formulations A and C and subsequently evaluated for curing. The resulting coatings were found to have little MEK resistance; the films were rubbed off.

Example 5

Synthesis of Acetoacetate Functional Polyester (Curable Polyester Resin 4)

Hydroxyl Functional Polyester 2:

A 500 mL, three-neck, round-bottom flask was equipped with a mechanical stirrer, a heated partial condenser, a Dean-Stark trap, and a water condenser. To the flask were charged neopentyl glycol (NPG) (163.3 g); trimethylolpropane (TMP) (9.99 g); 1,4-cyclohexanedicarboxylic acid (CHDA) (103.3 g); adipic acid (AD) (87.7 g), and the acid catalyst, Fascat-4100 (Arkema Inc.) (0.55). The reaction was allowed to react under nitrogen at 180° C. for 70 min., at 200° C. for 70 min., at 220° C. for 85 min., and at 230° C. for about 2 hours to yield a clear, viscous mixture. A total of 42 mL of distillate was collected in the Dean-Stark trap. The resulting mixture was allowed to cool to room temperature and subsequently collected (365 g). Acid number: <1.0 mgKOH/g; hydroxyl number: 116.9 mgKOH/g; glass transition temperature (Tg): −31.2° C.; number average molecular weight (Mn): 1519; weight average molecular weight (Mw): 2841.

Curable Polyester Resin 4:

To a 500 mL, three-neck, round-bottom flask equipped with a mechanical stirrer, a heated partial condenser, a Dean-Stark trap, and a water condenser were added the above hydroxyl-functional polyester 2 (80.0 g) and t-butyl acetoacetate (6.76 g). The mixture was gradually heated and allowed to react at 120° C. for 20 minutes and at 140° C. for two hours. A total of 3 ml of the condensate (t-butanol) was collected in the Dean-Stark adapter. The resulting viscous resin was allowed to cool and subsequently collected. Glass transition temperature (Tg): −33.4° C.; number average molecular weight (Mn): 1595; weight average molecular weight (Mw): 2974.

Example 6

Synthesis of Acetoacetate Functional Polyester (Curable Polyester Resin 5)

To a 500 mL, three-neck, round-bottom flask equipped with a mechanical stirrer, a heated partial condenser, a Dean-Stark trap, and a water condenser were added the above hydroxyl-functional polyester 2 (80.0 g) and t-butyl acetoacetate (11.27 g). The mixture was gradually heated and allowed to react at 120° C. for 15 minutes and at 140° C. for two hours. A total of 5 ml of the condensate (t-butanol) was collected in the Dean-Stark adapter. The resulting viscous resin was allowed to cool and subsequently collected. Glass transition temperature (Tg): −35.7° C.; number average molecular weight (Mn): 1520; weight average molecular weight (Mw): 2931.

Example 7

Synthesis of Acetoacetate Functional Polyester (Curable Polyester Resin 6)

To a 500 mL, three-neck, round-bottom flask equipped with a mechanical stirrer, a heated partial condenser, a Dean-Stark trap, and a water condenser were added the above hydroxyl-functional polyester 2 (80.0 g) and t-butyl acetoacetate (15.77 g). The mixture was gradually heated and allowed to react at 120° C. for 15 minutes and at 140° C. for 2 hours. A total of 8 ml of the condensate (t-butanol) was collected in the Dean-Stark adapter. The resulting viscous resin was allowed to cool and subsequently collected. Glass transition temperature (Tg): −37.1° C.; number average molecular weight (Mn): 1529; weight average molecular weight (Mw): 2887.

Example 8

Formulation and Evaluation of Curing of Curable Polyester Resins 1-6

Resin solutions (40% solids) were prepared by dissolving curable polyester resins 1-6 respectively in xylene. Formulations 1-6 (polyester/phenolic=70/30) were then prepared by mixing each resin solution (8.75 g) with Phenodur PR371/70B (available from Allnex) (2.14 g, 70% in n-butanol) and p-toluenesulfonic acid (pTSA) (0.625 g, 4% in isopropanol).

Evaluation of Curing:

Each of the above formulations was drawn down on a Bonderite 1000 cold-rolled steel test panel (ACT Test Panel Technologies) using a drawdown bar. The coated panels were then baked at 200° C. for 5 min. The baked panels (dried film thickness: about 20 μm) were then evaluated for curing by MEK double rubs (ASTM D4752). The results are listed in Table 1.

TABLE 1

Curing Evaluation of Formulations Based on Various Polyester Resins and Phenolic Resin

| | Polyester used in the formulation | | | | | |
|---|---|---|---|---|---|---|
| | Resin 1 | Resin 2 | Resin 3 | Resin 4 | Resin 5 | Resin 6 |
| MEK Double Rubs (200 rubs) | Slight effect | Almost no effect | Almost no effect | Moderate effect | Slight effect | Slight effect |

Example 9

Synthesis of Acetoacetate Functional Polyester (Curable Polyester Resin 7)

Hydroxyl Functional Polyester 3:

A 500 mL, three-neck, round-bottom flask was equipped with a mechanical stirrer, a heated partial condenser, a Dean-Stark trap, and a water condenser. To the flask were charged neopentyl glycol (NPG) (163.3 g); trimethylolpropane (TMP) (9.99 g); isophthalic acid (IPA) (139.6 g); adipic acid (AD) (52.6 g), and the acid catalyst, Fascat-4100 (Arkema Inc.) (0.55). The reaction was allowed to react under nitrogen at 180° C. for 60 min., at 200° C. for 60 min., at 220° C. for 90 min., and at 230° C. for about 2 hours to yield a clear, viscous mixture. A total of 45 mL of distillate was collected in the Dean-Stark trap. The resulting mixture was allowed to cool to room temperature and subsequently collected (298 g). Acid number: <1.0 mgKOH/g; hydroxyl number: 106.2 mgKOH/g; glass transition temperature (Tg): 0.2° C.; number average molecular weight (Mn): 1563; weight average molecular weight (Mw): 3156.

Curable Polyester Resin 7:

To a 500 mL, three-neck, round-bottom flask equipped with a mechanical stirrer, a heated partial condenser, a Dean-Stark trap, and a water condenser were added the above hydroxyl-functional polyester 3 (80.0 g) and t-butyl acetoacetate (11.27 g). The mixture was gradually heated and allowed to react at 140° C. for two hours. A total of 5.5 ml of the condensate (t-butanol) was collected in the Dean-Stark adapter. The resulting viscous resin was allowed to cool and subsequently collected. Glass transition temperature (Tg): −7.4° C.; number average molecular weight (Mn): 1472; weight average molecular weight (Mw): 3242.

Example 10

Formulation and Evaluation of Curing of Curable Polyester Resin 7

Formulations (polyester/phenolic=70/30) were prepared by mixing curable polyester resin 7 solution (10 g, 35% in MAK) with various phenolic resins respectively and p-toluenesulfonic acid (pTSA) (0.5 g, 5% in isopropanol).
Evaluation of Curing:

Each of the above formulations was drawn down on a Bonderite 1000 cold-rolled steel test panel (ACT Test Panel Technologies) using a drawdown bar. The coated panels were then baked at 205° C. for 10 min. The baked panels (dried film thickness: about 20 μm) were then evaluated for curing by MEK double rubs (ASTM D4752). The results are listed below:

TABLE 2

Curing Evaluation of Formulations Based on Polyester Resin 7 and Various Phenolic Resins

| | Phenolic resin used in the formulation | | | |
|---|---|---|---|---|
| | SP-103 (SI Group) (50% in MAK) | HRJ-1367 (SI Group) (50% in MAK) | PR516/60B (60% in butanol) | PR371/70B (70% in butanol) |
| MEK Double Rubs (film rubbed off at one end) | 40 | 100 | 100 | 200 |

What we claim is:
1. A thermosetting composition, comprising:
I) a curable polyester resin comprising the reaction product of a polyester resin with a compound containing a beta-ketoacetate moiety that does not contain a vinyl unsaturation, said polyester resin comprising the reaction product of:
   a) polyhydroxyl compounds comprising:
      (i) diol compounds in an amount of 70 mole %-100 mole %; and
      (ii) polyhydroxyl compounds having 3 or more hydroxyl groups in an amount of 0 to 30 mole %; wherein the mole % is based on 100% of all moles of polyhydroxyl compounds a); and
   b) polycarboxyl compounds comprising polycarboxylic acid compounds, derivatives of polycarboxylic acid compounds, the anhydrides of polycarboxylic acids, or combinations thereof; and
II) a phenolic resin substituted with at least one methylol group, wherein the phenolic resin is obtained by the reaction of phenolic compounds and an aldehyde at an aldehyde:phenol ratio of at least 1.1:1 and wherein the phenolic resin has at least one methylol substituent in the ortho position relative to the phenolic hydroxyl group.

2. The thermosetting composition of claim 1, wherein the phenolic resin contains an average of at least one methylol substituent per phenolic hydroxyl group.

3. The thermosetting composition of claim 1, wherein the phenolic resin is the reaction product of phenolic compounds with formaldehyde.

4. The thermosetting composition of claim 1, wherein the phenolic resin is not made by the addition of bisphenol A, F, or S.

5. The thermosetting composition of claim 1, wherein the phenolic resin is not made by the addition of a polyhydric phenol.

6. The thermosetting composition of claim 1, wherein the curable polyester does not contain vinyl unsaturation and does not contain alkyd residues.

7. The thermosetting composition of claim 1, wherein said compound having a beta-ketoacetate moiety comprises a compound represented by the following formula:

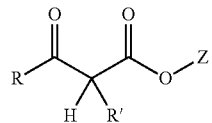

wherein R is a branched or straight chain, saturated or unsaturated alkyl, alicyclic, or aromatic group; R' is a hydrogen or a branched or straight chain, saturated or unsaturated alkyl, alicyclic, or aromatic group; Z is a branched or straight chain, saturated or unsaturated alkyl, alicyclic, or aromatic group; , and wherein R does not contain a vinyl unsaturation.

8. The thermosetting composition of claim 7, wherein R is a branched or straight chain alkyl group having 1-4 carbon atoms, R' is a hydrogen or a branched or straight alkyl having 1-4 carbon atoms; and Z is a branched or straight chain alkyl having 1-8 carbon atoms.

9. The thermosetting composition of claim 1, wherein the compound having a beta-ketoacetate moiety has molecular weight of less than 200.

10. The thermosetting composition of claim 1, wherein the compound having a beta-ketoacetate moiety corn prises diketene or an alkyl acetoacetate compound.

11. The thermosetting composition of claim 1, wherein the compound having a beta-ketoacetate moiety comprises t-butyl acetoacetate, ethyl acetoacetate, methyl acetoacetate, isobutyl acetoacetate, isopropyl acetoacetate, n-propyl acetoacetate, n-butyl acetoacetate, t-anyl acetotacetate, or diisopropyl carbinol acetoacetate.

12. The thermosetting composition of claim 1, wherein the compound having a beta-ketoacetate moiety comprises t-butyl acetoacetate.

13. The thermosetting composition of claim 1, wherein the thermosetting composition comprises said polyester resin (I) in an amount of 70 to 97 wt. % and said phenolic resin (II) in an amount of 3 to 30 wt. %, based on the total weight of (I) and (II).

14. The thermosetting composition of claim 1, wherein the polycarboxylic acid compounds (b) comprise isophthalic acid, dimethyl isophthalate, terephthalic acid, dimethyl terephthalate, phthalic acid, phthalic anhydride, 1,4-cyclohexanedicarboxylic acid, 1,3-cyclohexanedicarboxylic acid, adipic acid, 2,6-naphthalenedicarboxylic acid, 1,4-naphthalenedicarboxylic acid, 2,5-naphthalene-dicarboxylic acid, hexahydrophthalic anhydride, tetrahydrophthalic anhydride, trimellitic anhydride, succinic anhydride, succinic acid, or mixtures thereof.

15. The thermosetting composition of claim 14, wherein the polycarboxylic acid compounds (b) comprise isophthalic acid, dimethyl isophthalate, phthalic acid, phthalic anhydride, 1,4-cyclohexanedicarboxylic acid, adipic acid, hexahydrophthalic anhydride, tetrahydrophthalic anhydride, trimellitic anhydride, or mixtures thereof.

16. The thermosetting composition of claim 1, wherein the poycarboxylic acid compounds (b) do not include terephthalic acid or a derivative of terephthalic acid.

17. The thermosetting composition of claim 1, wherein all of the polyhydroxyl compounds (a) are hydrocarbons and do not contain atoms other than hydrogen, carbon and oxygen.

18. The thermosetting composition of claim 1, wherein the diols (a)(i) comprise 2,2,4,4-tetraalkylcyclobutane-1,3-diol (TACD).

19. The thermosetting composition of claim 1, wherein the diols (a)(i) comprise 2,2-dimethyl-1,3-propanediol (neopentyl glycol).

20. The thermosetting composition of claim 1, wherein the diols (a)(i) are present in an amount of 80 to 98 mole %, based on 100 mole % of all polyhydroxyl compounds (a).

21. The thermosetting composition of claim 1, wherein the polyhydroxyl compounds comprise polyhydroxyl compounds (a)(ii) having 3 or more hydroxyl groups, said polyhydroxyl compounds (a)(ii) comprising 1,1,1-trimethylol propane, 1,1,1-trimethylolethane, glycerin, pentaerythritol, erythritol, threitol, dipentaerythritol, sorbitol, or mixtures thereof.

22. The thermosetting composition of claim 1, wherein the amount of polyhydroxyl compounds (a)(ii) is 2 to 15 mole %, based on 100 mole % of all polyhydroxyl compounds (a).

23. The thermosetting composition of claim 1, wherein none of the polyhydroxyl compounds (a) contain any ester or carboxyl (—COO—) groups.

24. The thermosetting composition of claim 1, wherein none of the polyhydroxyl compounds (a) have any carbonyl groups (—CO—).

25. The thermosetting composition of claim 1, wherein none of the polyhydroxyl compounds (a) contain any ether groups.

26. The thermosetting composition of claim 1, wherein the compound having a beta-ketoacetate moiety is reacted with the polyester resin in an amount of 3 to about 40 wt. % based on the based on the weight of the compound and the polyester resin.

27. The thermosetting composition of claim 1, wherein the polyester resin has a hydroxyl number of 50-240 mg KOH/g, and at least 70% of the hydroxyl groups on the polyester resin are consumed with the residues of the compound having the beta-ketoacetate moiety.

28. The thermosetting composition of claim 1, wherein the curable polyester (I) has an acid number in a range of 0-10 mg KOH/g.

29. The thermosetting composition of claim 1, wherein the polyester resin used to make the curable polyester (I) has a hydroxyl number in the range of 30-240 mgKOH/g.

30. The thermosetting composition of claim 29, wherein said polyester resin has a hydroxyl number in a range of 80-240 mg KOH/g.

31. The thermosetting composition of claim 30, wherein said polyester resin has a hydroxyl number in a range of 80-150 mq KOH/g.

32. The thermosetting composition of claim 1, wherein the curable polyester (I) has an Mn within a range of 1,100 to 3,000 g/mole.

33. The thermosetting composition of claim 1, wherein said phenolic resin comprises a resole phenolic resin.

34. The thermosetting composition of claim 33, wherein said phenolic resin comprises a resole phenolic resin based on unsubstituted phenol and/or meta-substituted phenol.

35. The thermosetting composition of claim 33, wherein said phenolic resin comprises a resole phenolic resin based on unsubstituted phenol.

36. The thermosetting composition of claim 1, further comprising an amino containing crosslinking resin.

37. The thermosetting composition of claim 1, wherein the composition comprises a crosslinking composition comprising greater than 60 wt. % of said phenolic resin (II) and the remainder an amine based crosslinking resin, based on the weight of all crosslinking compounds present in the thermosetting composition.

38. The thermosetting composition of claim 1, wherein the (a)(i) diol comprises 2,2,4,4-tetramethylcyclobutane-1,3-diol.

39. The thermosetting composition of claim 37, wherein the (a)(ii) polyhydroxyl compound comprises 1,1,1-trimethylol propane, 1,1,1-trimethylolethane, glycerin, pentaerythritol, or combinations thereof.

40. The thermosetting composition of claim 1, wherein said curable polyester resin containing beta-ketoacetate moieties without vinyl unsaturation is represented by the following formula:

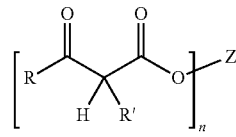

wherein R is a branched or straight chain, saturated or unsaturated alkyl, alicyclic, or aromatic group; R' is a hydrogen or a branched or straight chain, saturated or unsaturated alkyl, alicyclic, or aromatic group; Z is a polyester polymer residue; and n is an average number of groups per polyester chain in said polyester resin of at least 0.5.

41. The thermosetting composition of claim 40, wherein R is a branched or straight chain alkyl group having 1-4 carbon atoms, R' is a hydrogen or a branched or straight alkyl having 1-4 carbon atoms; and n is an average number within a range of 0.5 to 5.

* * * * *

UNITED STATES PATENT AND TRADEMARK OFFICE
CERTIFICATE OF CORRECTION

PATENT NO. : 9,598,602 B2  Page 1 of 1
APPLICATION NO. : 14/540490
DATED : March 21, 2017
INVENTOR(S) : Kuo et al.

It is certified that error appears in the above-identified patent and that said Letters Patent is hereby corrected as shown below:

In the Claims

Column 28, Line 45, Claim 10: "corn prises" should read --comprises--

Column 29, Line 11, Claim 16: "poycarboxylic" should read --polycarboxylic--

Signed and Sealed this
Sixteenth Day of May, 2017

Michelle K. Lee
*Director of the United States Patent and Trademark Office*